(12) United States Patent
Son et al.

(10) Patent No.: US 12,191,560 B2
(45) Date of Patent: Jan. 7, 2025

(54) BINDING MEMBER INCLUDING ANTENNA AND ELECTRONIC DEVICE INCLUDING THE SAME

(71) Applicant: Samsung Electronics Co., Ltd., Gyeonggi-do (KR)

(72) Inventors: Hyeonchang Son, Gyeonggi-do (KR); Hyungpil Kum, Gyeonggi-do (KR); Donghwan Seo, Gyeonggi-do (KR); Jinbae Lee, Gyeonggi-do (KR); Kyeongmun Jo, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 255 days.

(21) Appl. No.: 17/695,322

(22) Filed: Mar. 15, 2022

(65) Prior Publication Data

US 2022/0416401 A1   Dec. 29, 2022

Related U.S. Application Data

(63) Continuation of application No. PCT/KR2022/000732, filed on Jan. 14, 2022.

(30) Foreign Application Priority Data

Jun. 29, 2021  (KR) ........................ 10-2021-0084541

(51) Int. Cl.
    *H01Q 1/27*   (2006.01)
    *H01Q 9/42*   (2006.01)
(52) U.S. Cl.
    CPC .............. *H01Q 1/273* (2013.01); *H01Q 9/42* (2013.01)

(58) Field of Classification Search
    CPC .......... H01Q 1/273; H01Q 9/42; H01Q 21/28; G04G 17/04; G04G 21/04; G04R 60/04; G04R 60/06; G06F 1/163; G06F 1/1698
    See application file for complete search history.

(56) References Cited

U.S. PATENT DOCUMENTS 9,172,148 B2   10/2015   Lyons et al.
9,257,740 B2   2/2016   Lyons et al.
(Continued)

FOREIGN PATENT DOCUMENTS

CN      110336118       10/2019
KR      1020090102264   9/2009
(Continued)

OTHER PUBLICATIONS

International Search Report dated May 2, 2022 issued in counterpart application No. PCT/KR2022/000732, 9 pages.

*Primary Examiner* — Robert Karacsony
(74) *Attorney, Agent, or Firm* — The Farrell Law Firm, P.C.

(57) ABSTRACT

An electronic device is provided and includes a housing including a first antenna, and a binding member configured to be bound to one side of the housing. The binding member includes a strap body, a coupling part formed at one end portion of the strap body and bound to one side of the housing, an expansion part expanded inward from the housing from one end portion of the strap body, and making contact with at least a portion of a rear surface of the housing when bound, a second antenna provided in the strap body, and a coupler electrically connected with the second antenna, provided in at least a portion of the extension part, the coupler being configured to transmit a signal received through the second antenna to the first antenna.

19 Claims, 27 Drawing Sheets

(56) References Cited

U.S. PATENT DOCUMENTS

| | | | |
|---|---|---|---|
| 9,734,315 | B2 | 8/2017 | Seol et al. |
| 10,615,489 | B2 | 4/2020 | Vanjani |
| 2014/0225786 | A1 | 8/2014 | Lyons et al. |
| 2016/0013544 | A1 | 1/2016 | Lyons et al. |
| 2016/0063232 | A1 | 3/2016 | Seol et al. |
| 2016/0141746 | A1* | 5/2016 | Kim .................. H01Q 1/273 |
| | | | 343/718 |
| 2016/0322745 | A1 | 11/2016 | Shedletsky |
| 2017/0358850 | A1 | 12/2017 | Vanjani |
| 2019/0221922 | A1 | 7/2019 | Ahn et al. |

FOREIGN PATENT DOCUMENTS

| | | |
|---|---|---|
| KR | 10-2010-0071410 | 6/2010 |
| KR | 1020150045746 | 4/2015 |
| KR | 1020160033935 | 3/2016 |
| KR | 1020170047770 | 5/2017 |
| KR | 1020190086892 | 7/2019 |

\* cited by examiner

BINDING MEMBER INCLUDING ANTENNA AND ELECTRONIC DEVICE INCLUDING THE SAME

CROSS-REFERENCE TO RELATED APPLICATIONS

This application is a continuation of International Application No. PCT/KR2022/000732 designating the United States, filed on Jan. 14, 2022, in the Korean Intellectual Property Receiving Office and claiming priority to Korean Patent Application No. 10-2021-0084541, filed on Jun. 29, 2021, in the Korean Intellectual Property Office, the disclosures of which are incorporated by reference herein in their entireties.

BACKGROUND

1. Field

The present disclosure relates generally to an electronic device and, more particularly, to a binding member including an antenna and an electronic device including the same.

2. Description of Related Art

Electronic devices are being developed in smaller sizes that are easier to carry. Despite being small, these electronic devices may perform more functions than ever before. Such electronic devices may be carried in a user's pocket and/or be worn on the wrist of the user, a head portion of the user, or the arm of the user, thereby improving the portability and the accessibility of the user.

The above-described wearable electronic device (e.g., a watch-type electronic device and/or a small-sized electronic device) may not have a sufficient mounting space for various parts due to a limitation in size. For example, it is difficult to mount various types of antennas to transmit/receive signals in various bands within a limited mounting space. Although the various types of antennas can be mounted, a length of the antenna may be limited, thereby degrading antenna performance.

Accordingly, the disclosure provides one or more embodiments of an electronic device capable of improving antenna performance using a binding member (e.g., a strap) including an antenna.

SUMMARY

The present disclosure has been made to address the above-mentioned problems and disadvantages, and to provide at least the advantages described below.

According to an aspect of the present disclosure, an electronic device includes a housing including a first antenna, and a binding member configured to be coupled to one side of the housing. The binding member includes a strap body, a coupling part formed at one end portion of the strap body and bound to one side of the housing, an expansion part expanded inward from the housing from one end portion of the strap body and configured to make contact with at least a portion of a rear surface of the housing, a second antenna provided in the strap body, and a coupler electrically connected with the second antenna, provided in at least a portion of the expansion part, and configured to transmit a signal received through the second antenna to the first antenna.

According to another aspect of the present disclosure, a binding member bound to an electronic device includes a strap body, an antenna provided in the strap body, and a coupler electrically connected with the antenna and configured to transmit a signal received through the antenna to the electronic device.

According to various embodiments of the disclosure, the antenna is included in the binding member connected with the electronic device, thereby sufficiently ensuring there to be an adequate length of the antenna and improving antenna performance, as compared to when the antenna is included inside the housing of the electronic device.

Effects derived from the disclosure are not limited to the above effects.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
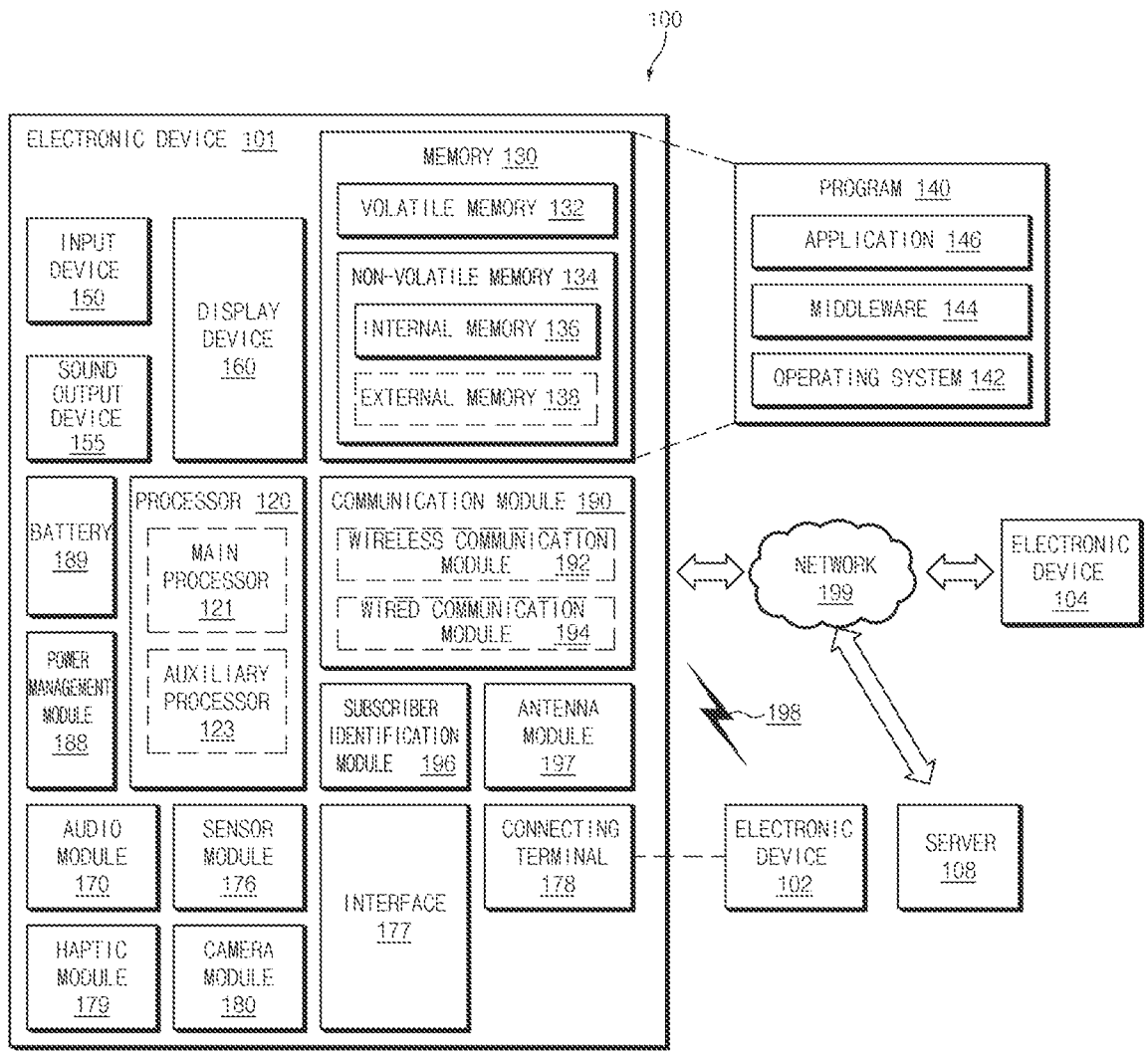
FIG. 1 is a block diagram of an electronic device in a network environment, according to an embodiment.

Various embodiments of the disclosure may be described with reference to the accompanying drawings. However, various embodiments of the present disclosure are not limited to particular embodiments, and it should be understood that modifications, equivalents, and/or alternatives of the embodiments described herein can be variously made. With regard to description of drawings, similar components may be marked by similar reference numerals.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an ISP or a CP) may be implemented as part of another component (e.g., the camera module 180 or the communication module 190) functionally related to the auxiliary processor 123. According to an embodiment, the auxiliary processor 123 (e.g., the NPU) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, ISPs, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a PCB, a RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

A method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
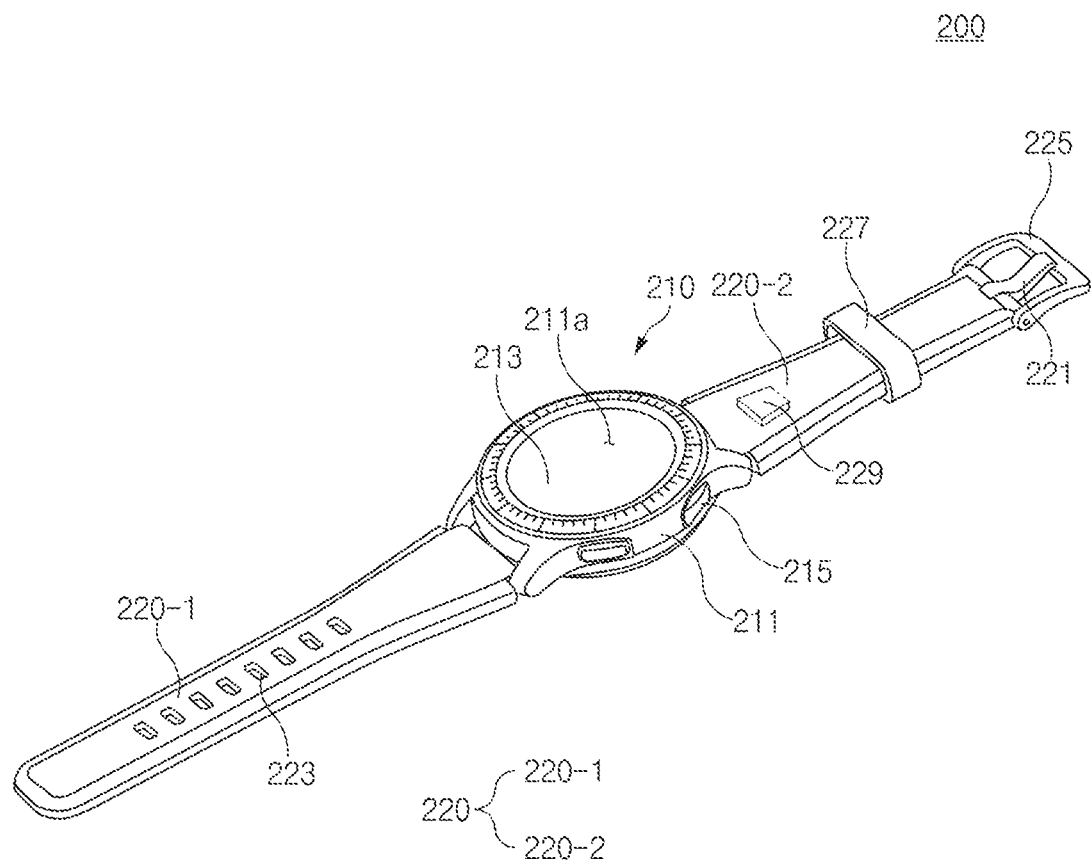
FIG. 2A is a front perspective view of an electronic device, according to an embodiment.

FIG. 2A is a front perspective view of an electronic device, according to an embodiment. In addition, FIG. 2B is a rear perspective view of an electronic device, according to an embodiment.

Figure 2B:
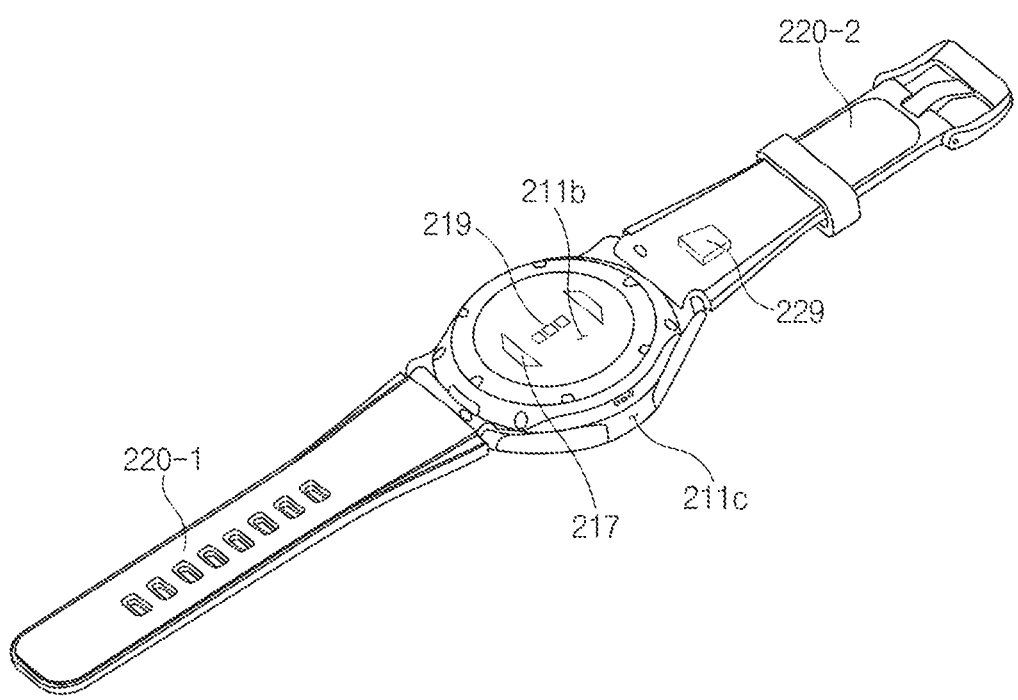
FIG. 2B is a rear perspective view of an electronic device, according to an embodiment.

Referring to FIGS. 2A and 2B, an electronic device 200 (e.g., the electronic device 101) may be a wearable device in the form of a watch worn on a body (e.g., a wrist). However, this is provided for illustrative purposes, and the disclosure is not limited thereto. For example, the electronic device 200 may be implemented in the form of various types of wearable devices, such as a band-type wearable device.

Figure 10A:
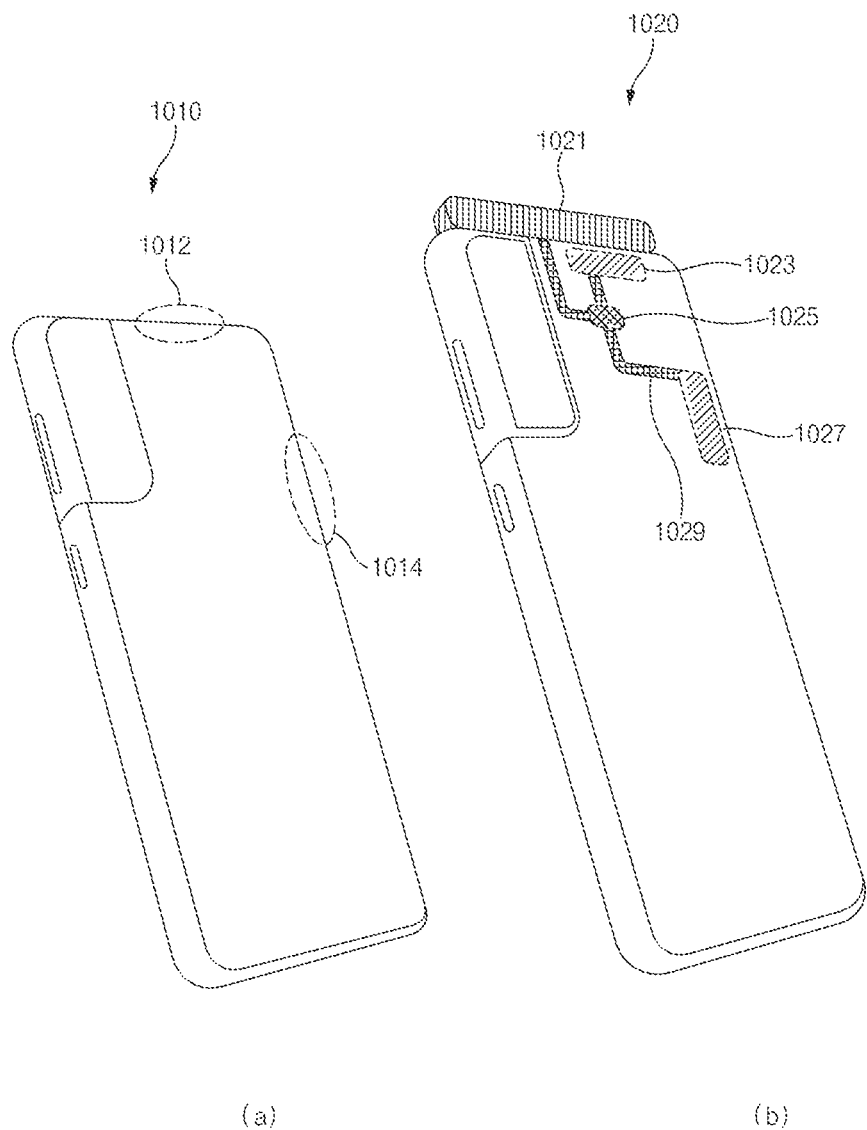
FIGS. 10A and 10B are views illustrating a binding member and an electronic device, according to various embodiments.
Figure 10B:
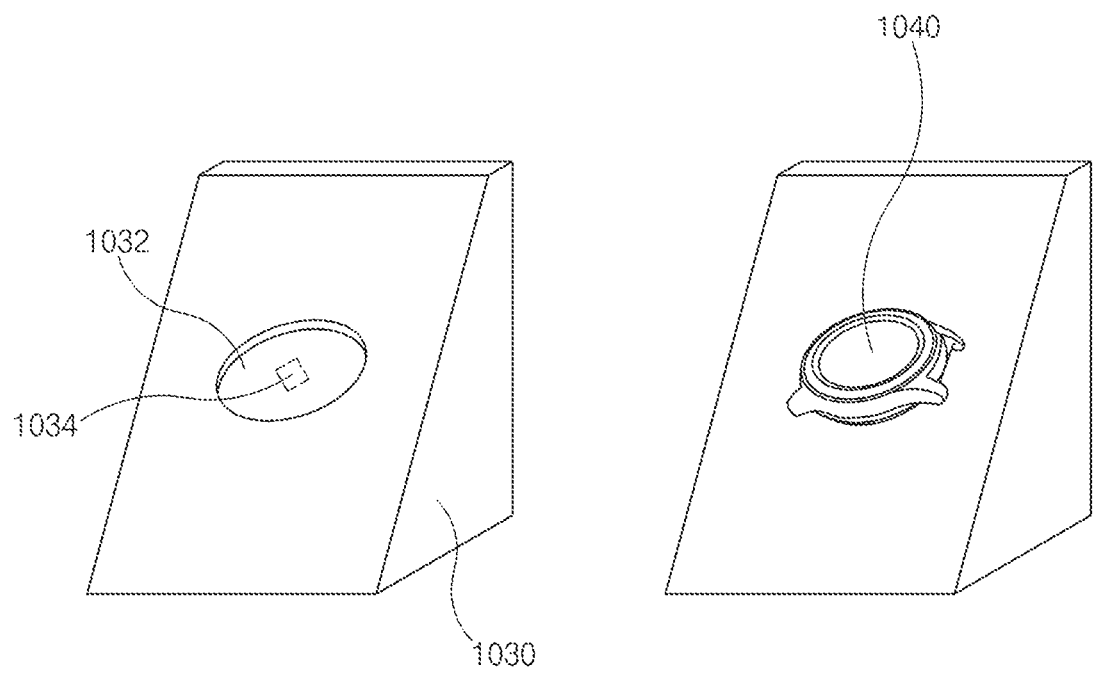

The electronic device 200 includes a main body 210 and a binding member 220. The binding member 220 may be a strap member connected with the main body 210 and configured to enable the electronic device 200 to be detachably worn on part of a body (e.g., a wrist) of a user. In addition, the binding member 220 may include various components, such as a protective case and a part of a dashboard of a vehicle, to be bound to the main body 210 of the electronic device 200 as illustrated in FIGS. 10A and 10B.

The main body 210 may include a housing 211, a display 213, a first electrode 215, a second electrode 217, and an optical sensor 219. The optical sensor 219 may include a biometrics sensor (e.g., a photoplethysmogram (PPG) sensor) configured to obtain a bio-signal (e.g., a PPG signal). In addition, the electronic device 200 may be implemented with more or less components than illustrated in FIGS. 2A and 2B. In addition, at least one of the above-described components may include a plurality of components.

The housing 211 may form an outer appearance of the electronic device 200. The housing 211 may include a first surface 211a (e.g., a front surface), a second surface 211b (e.g., a rear surface), and a third surface 211c (e.g., a side surface) to surround a space between the first surface 211a and the second surface 211b. At least some of the above components may be viewed through the housing 211.

As illustrated in FIG. 2A, the display 213 may be viewed through the first surface 211a of the housing 211. As illustrated in FIG. 2B, the second electrode 217 and the optical sensor 219 may be viewed through the second surface 211b of the housing 211. As illustrated in FIGS. 2A and 2B, the first electrode 215 may be viewed through the third surface 211c of the housing 211. In addition, at least one of the display 213, the first electrode 215, the second electrode 217, or the optical sensor 219 may be disposed at a different position than the abovementioned positions.

The display 213 may be configured to provide visible information (e.g., a text, an image, a video, an icon, or a symbol) to a user and to receive a user input (e.g., a touch input).

The electronic device 200 may obtain bio-information through the first electrode 215, the second electrode 217, and the optical sensor 219.

The optical sensor 219 may include at least one light emitting device configured to irradiate light toward the body when the second surface 211b of the housing 211 makes contact with part of the body, and at least one light receiving device to sense the light reflected from the body and to generate a bio-signal by performing photoelectric conversion with respect to the sensed light. For example, the at least one light emitting device may be implemented by using a light emitting diode (LED), an organic LED (OLED), a quantum dot LED (QLED), a laser diode, or a phosphor. In addition, the at least one light receiving device may be implemented with a photo detector or a photo diode. In this regard, the electronic device 200 may measure various types of bio-information such as a blood pressure, an oxygen saturation, a heart rate, an electrocardiogram, or skin moisture based on the generated bio-signal.

When the electronic device 200 is worn on the part of the body, the second electrode 217 exposed through the second surface 211b of the housing 211 may make contact with the part of the body. In this state, the first electrode 215 exposed through the third surface 211c of the housing 211 makes contact with another part (e.g., a finger) of the body to form a closed loop in which the first electrode 215, the body, and the second electrode 217 are connected with each other. The terminology "closed loop" may refer to an electrical path formed as the electronic device 200 makes contact with the body of the user. In this regard, the electronic device 200 may measure various types of bio-information, such as a galvanic skin response, electrocardiography, bioelectrical impedance, electromyography, electroencephalography, or electrooculography, based on a current flowing through the closed loop.

The binding member 220 may be coupled to the housing 211 and configured to enable the electronic device 200 to be detachably worn on part of a body (e.g., a wrist) of a user. The binding member 220 may include a strap member configured to be bent in the form of surrounding the part of the body of the user. The binding member 220 may include a first binding member 220-1 and a second binding member 220-2, as illustrated in FIG. 2A. The binding member 220 may include at least one of a fixing member 221, a fixing member binding hole 223, a band guide member 225, and a band fixing ring 227. The fixing member 221 may be configured to fix the housing 211 and the binding member 220 to the part (e.g., a wrist or an ankle) of the body of the user. The fixing member binding hole 223 may fix the housing 211 and the binding member 220 to the part of the body of the user to correspond to the fixing member 221. The band guide member 225 may be configured to restrict the movement range of the fixing member 221 when the fixing member 221 is bound to the fixing member binding hole 223, such that the binding member 220 is bound to the part of the body of the user in close contact with the part of the body of the user. The band fixing ring 227 may restrict the movement range of the binding member 220 in the state in which the fixing member 221 and the fixing member binding hole 223 are bound together.

The binding member 220 (e.g., the first binding member 220-1 and/or the second binding member 220-2) may include an antenna 229 configured to transmit a signal to an outside (e.g., to the electronic device 102, to the electronic device 104, or to the server 108) or to receive a signal from the outside. The antenna 229 may include a conductive pattern that is utilized for GNSS communication. However, this is provided for the illustrative purpose, and the disclosure is not limited thereto. For example, the antenna 229 may include various types of conductive patterns, such as a conductive pattern utilized for short-range wireless communication, such as WiFi, Bluetooth, and NFC, and a conductive pattern that is utilized for transmitting and/or receiving a magnetic signal.

The antenna 229 may have a structure disposed inside the binding member 220 such that the antenna 229 is prevented from being exposed to the outside. An inner space of the binding member 220, which is to dispose the antenna 229, does not receive additional parts. Accordingly, various types of antennas or an antenna supporting various frequency bands may be mounted in the inner space of the binding member 220, thereby improving the antenna performance of the electronic device 200.

Figure 3A:
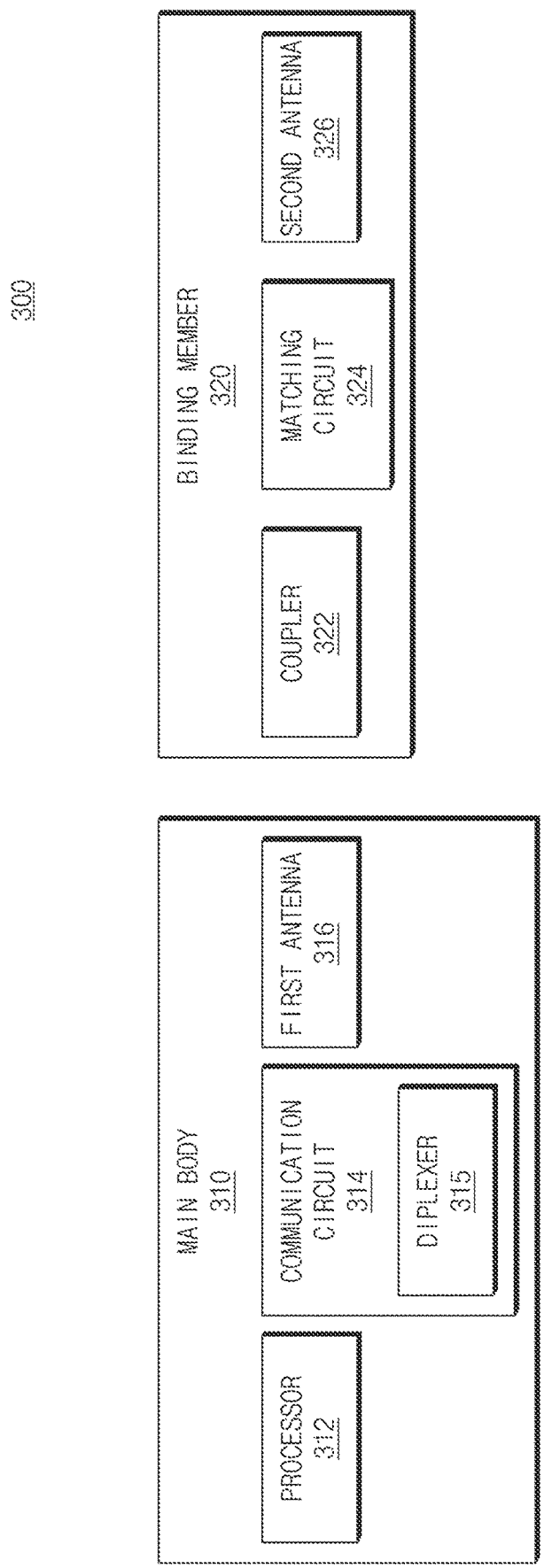
FIG. 3A is a view illustrating the configuration of an electronic device, according to an embodiment.
Figure 3B:
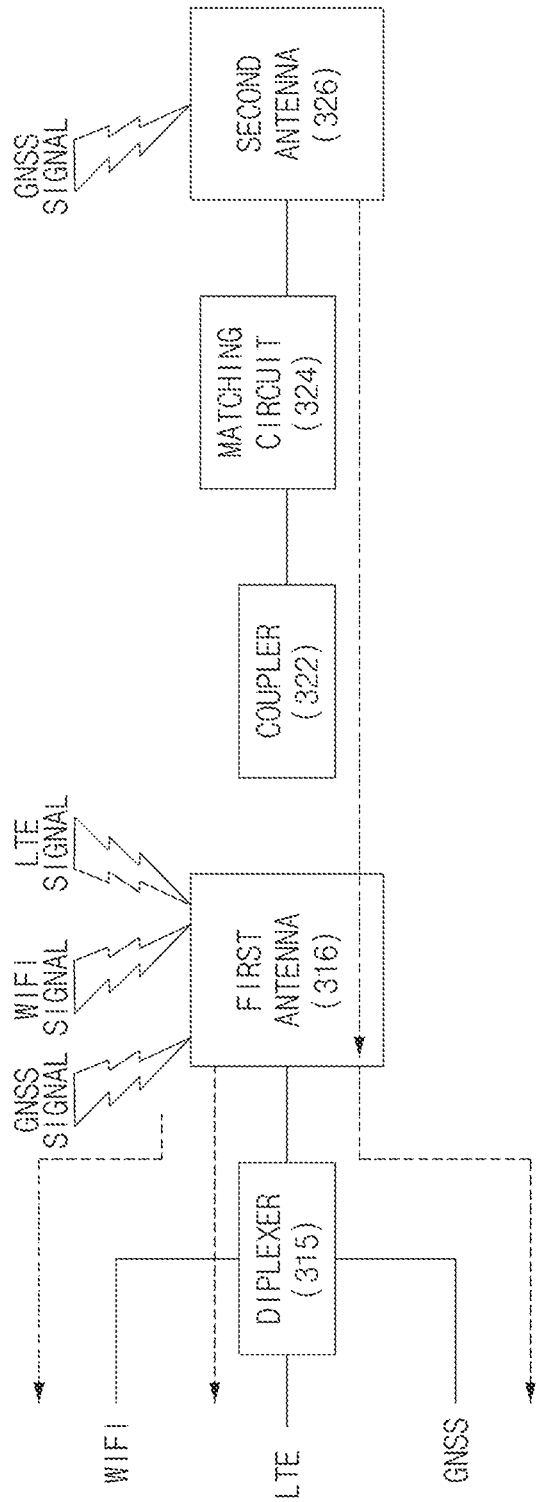
FIG. 3B is a view illustrating a transmit path for a signal received through a first antenna and a second antenna of an electronic device, according to an embodiment.
Figure 4:
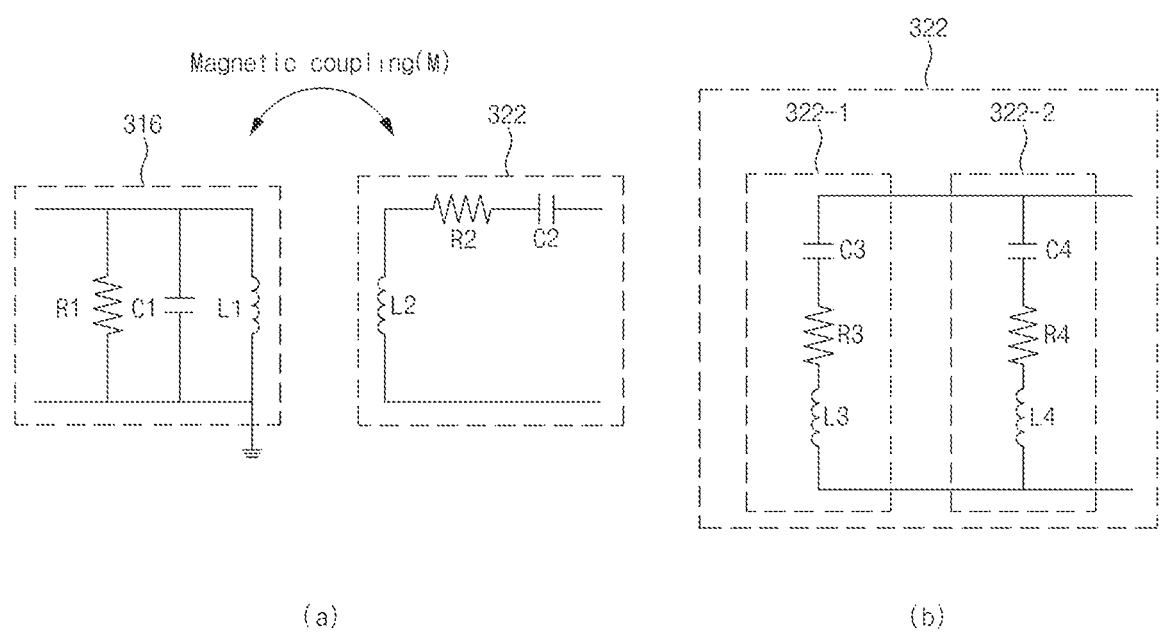
FIG. 4 is a view illustrating an equivalent circuit of a component of an electronic device, according to an embodiment.

FIG. 3A is a view illustrating the configuration of an electronic device, according to an embodiment. FIG. 3B is a view illustrating a transmit path for a signal received through a first antenna and a second antenna, according to an embodiment. FIG. 4 is a view illustrating an equivalent circuit of a component of an electronic device, according to an embodiment.

Referring to FIGS. 3A-3B, an electronic device 300 (e.g., the electronic device 200) includes a main body 310 (e.g., the main body 210) and a binding member 320 (e.g., the binding member 220).

The main body 310 includes a processor 312, a communication circuit 314, and a first antenna 316. The binding member 320 includes a coupler 322, a matching circuit 324, and a second antenna 326 (e.g., the antenna 229). In addition, the main body 310 and/or the binding member 320 may be implemented with more or less components than illustrated in FIG. 3A.

The first antenna 316 may include a conductive pattern that is utilized for GNSS communication. The first antenna 316 may receive a signal in a first frequency band. For example, the first frequency band may include a GPS L1 band (e.g., a band having the central frequency of 1575.42 megahertz (MHz)).

The second antenna 326 may include a conductive pattern that is utilized for GNSS communication.

In addition, the second antenna 326 may receive a signal in the first frequency band. The space of the main body 310, which has the first antenna 316, may be narrower than an inner space of the binding member 320, which has the second antenna 326. Accordingly, even though the second antenna 326 is designed to receive a signal in the same frequency band as the first antenna 316, the second antenna 326 may exhibits higher performance, as compared to the performance of the first antenna 316.

The second antenna 326 may receive a signal in a second frequency band different from the first frequency band. For example, the second frequency band may include a GPS L5 band (e.g., a band having a central frequency of 1176.45 MHz). In addition, the second frequency band may include a GPS L1 band and a GPS L5 band. In this case, the second antenna 326 may be implemented by adding a stub, which supports the GPS L5 band, to a monopole antenna supporting the GPS L1 band. However, this is provided for the illustrative purpose, and the disclosure is not limited thereto.

The first antenna 316 may be electrically connected with (or coupled to) the second antenna 326. For example, the electrical connection may form a path (or a transmission and/or reception path) in which a signal received through the second antenna 326 may be sent to the first antenna 316.

The first antenna 316 and the second antenna 326 may be electrically connected with each other by the coupler 322 disposed (or included) in the binding member 320. The coupler 322 may be a resonance coupler including an inductance component to generate magnetic coupling together with an inductance component constituting the first antenna 316. Accordingly, the first antenna 316 and the second antenna 326 are electrically connected with each other without an additional external connector, thereby preventing waterproof and/or dustproof performance from being deteriorated due to the use of an external connector.

Accordingly, as in illustrated in an equivalent circuit of reference sign (a) of FIG. 4, a parallel connection among a first inductor L1, a capacitor C1, and a resistor R1 may correspond to the first antenna 316, and a series-connection among a second inductor L2, a second capacitor C2, and a second resistor R2 may correspond to the coupler 322. As the coupler 322 performs magnetic coupling (M) with respect to the first antenna 316 through a magnetic field generated by a resonant frequency based on the second capacitor C2 and the second inductor L2, a signal received through the second antenna 326 may be transmitted to the first antenna 316.

According to an embodiment, when the second antenna 326 is configured to receive a signal in a multi-band (e.g., a GPS L1 band and a GPS L5 band), the coupler 322 may include a first coupler 322-1 including a third inductor L3, a third resistor R3, and a third capacitor C3, and a second coupler 322-2 including a fourth inductor L4, a fourth resistor R4, and a fourth capacitor C4, as illustrated in the equivalent circuit of reference sign (b) of FIG. 4. In this regard, the first coupler 322-1 may generate a magnetic field corresponding to the first resonance frequency based on the third capacitor C3 and the third inductor L3, thereby transmitting, to the first antenna 316, one of signals in multiple bands, which are received through the second antenna 326. In addition, the second coupler 322-2 may generate a magnetic field corresponding to the second resonance frequency based on the fourth capacitor C4 and the fourth inductor L4, thereby transmitting, to the first antenna 316, signals in multiple bands, which are received through the second antenna 326.

The matching circuit 324 may match impedances between the coupler 322 and the second antenna 326. The matching circuit 324 may reduce signal loss (or reflection), which is caused by the difference in impedance between the coupler 322 and the second antenna 326, by matching impedances between the coupler 322 and the second antenna 326. The matching circuit 324 may be implemented as a component of the coupler 322. However, this is provided for the illustrative purpose, and the disclosure is not limited thereto. For example, the matching circuit 324 may be separated from the coupler 322 or may be implemented as another component other than the coupler 322.

A transmission and/or reception path may be formed with respect to a signal, which is transmitted and/or received through the second antenna 326, between the coupler 322 and the second antenna 326. In this regard, the transmission and/or reception path may be formed through a radio frequency (RF) cable to connect the coupler 322 with the second antenna 326. For example, the coupler 322 is connected with the second antenna 326 through an RF cable (e.g., an RF coaxial cable or a flexible printed circuit board (FPCB)) having a specified impedance (e.g., 50Ω), thereby performing impedance matching between the coupler 322 and the second antenna 326.

The communication circuit 314 may be connected with the first antenna 316 and may process a signal received from the outside or a signal to be transmitted to the outside. The communication circuit 314 may include a switch circuit to sort transmitted and/or received signals, and various amplifiers and/or filter circuits to enhance signal quality of the transmitted and/or received signals. For example, the communication circuit 314 may include a diplexer 315 configured to isolate a signal received through the first antenna 316 based on a cutoff frequency. The communication circuit 314 may include a communication circuit to process a signal received or a signal to be transmitted through the first antenna 316 and a communication circuit to process a signal received or a signal to be transmitted through the second antenna 326.

The processor 312 may be electrically connected with the communication circuit 314 to control the communication circuit 314. The processor 312 may process a signal of the first frequency band transmitted and/or received through the first antenna 316. The processor 312 may provide a service related to the position of the electronic device 300, based on a GNSS signal received through the first antenna 316. In addition, the processor 312 may provide a service related to a signal in the second frequency band, which is transmitted and/or received through the second antenna 326 and the first antenna 316.

In the state that the first antenna 316 is not electrically coupled to the second antenna 326, for example, the state that the path, in which a signal transmitted and/or received through the second antenna 326 is provided to the first antenna 316, is not formed, the processor 312 may process the signal transmitted and/or received through the first antenna 316. For example, the processor 312 may process a signal in the first frequency band, which is transmitted and/or received through the first antenna 316.

As illustrated in FIG. 3B, the signal received through the first antenna 316 may be isolated based on frequency bands through the diplexer 315. For example, when the first antenna 316 is configured to transmit and/or receive a first signal (e.g., a GNSS signal), a second signal (e.g., a long term evolution (LTE) signal), and a third signal (e.g., a WiFi signal), a signal received through the first antenna 316 may be provided to the diplexer 315, and the diplexer 315 may isolate the first signal, the second signal, and the third signal from the received signal, based on the cut-off frequency, and may send the isolated signal to the processor 312.

In the state that the first antenna 316 is electrically coupled to the second antenna 326, for example, the state that the path, in which a signal received through the second antenna 326 is provided to the first antenna 316, is formed, the processor 312 may process the signal received through the first antenna 316 and the second antenna 326. For example, the processor 312 may process a signal in the second frequency band, which is received through the first antenna 316 and the second antenna 326.

As illustrated in FIG. 3B, the signal received through the first antenna 316 may be isolated based on frequency bands through the diplexer 315. In addition, as the first antenna 316 may be electrically coupled to the second antenna 326, the signal received through the second antenna 326 may be provided to the diplexer 315 through the first antenna 316. Accordingly, when the second antenna 326 is configured to transmit and/or receive the fourth signal (e.g., a GNSS signal), the diplexer 315 may isolate the fourth signal from the signal received through the first antenna 316, and may send the fourth signal to the processor 312.

In the state that the first antenna 316 is electrically coupled to the second antenna 326, for example, the state that the path, in which the signal received through the second antenna 326 is provided to the first antenna 316, is formed, the processor 312 may selectively process the signal in the first frequency band, which is received through the first antenna 316, and the signal in the second frequency band, which is received through the second antenna 326. The signal in the first frequency band and the signal in the second frequency band may be at least partially overlapped with each other in band. In this regard, the processor 312 may select and process a signal received through an antenna having the best performance, among the first antenna 316 or the second antenna 326.

In addition, the signal in the first frequency band and the signal in the second frequency band may be signals in mutually different bands. In this regard, the processor 312 may use one of the signal in the first frequency band or the signal in the second frequency band and may correct another signal of the signal in the first frequency band or the signal in the second frequency band.

The above description has been made with reference to FIGS. 3A and 3B in that the first antenna 316 and the second antenna 326 include a conductive pattern that is utilized for the GNSS communication. However, this is provided for an illustrative purpose. The first antenna 316 and/or the second antenna 326 may include various types of conductive patterns, such as a conductive pattern utilized for short-range wireless communication, such as WiFi communication, Bluetooth™ communication, and NFC, and a conductive pattern that is utilized to transmit and/or receive a magnetic signal.

Figure 5A:
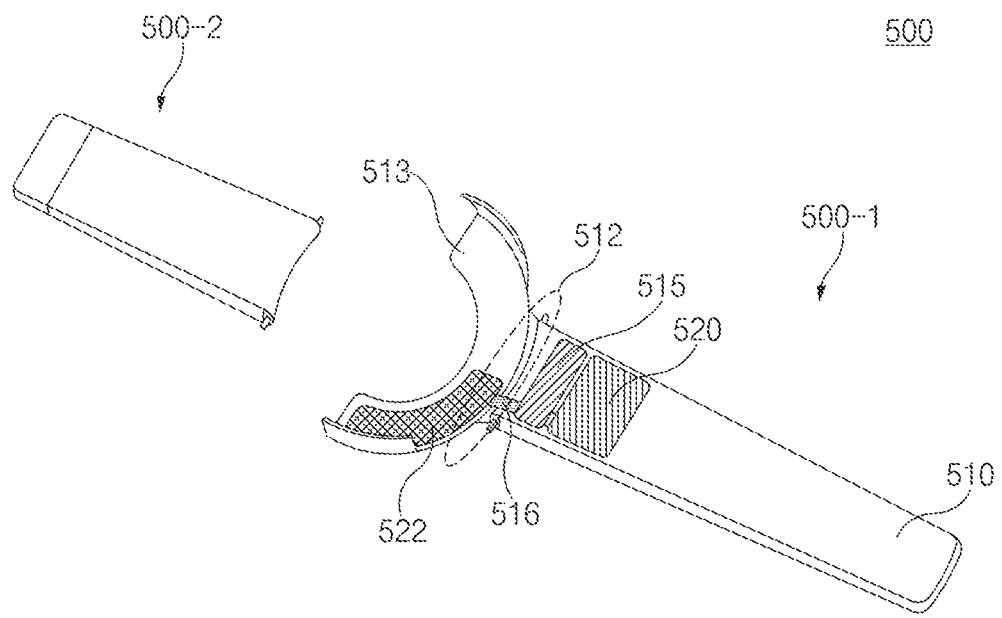
FIG. 5A is a perspective view illustrating a binding member, according to an embodiment.
Figure 5B:
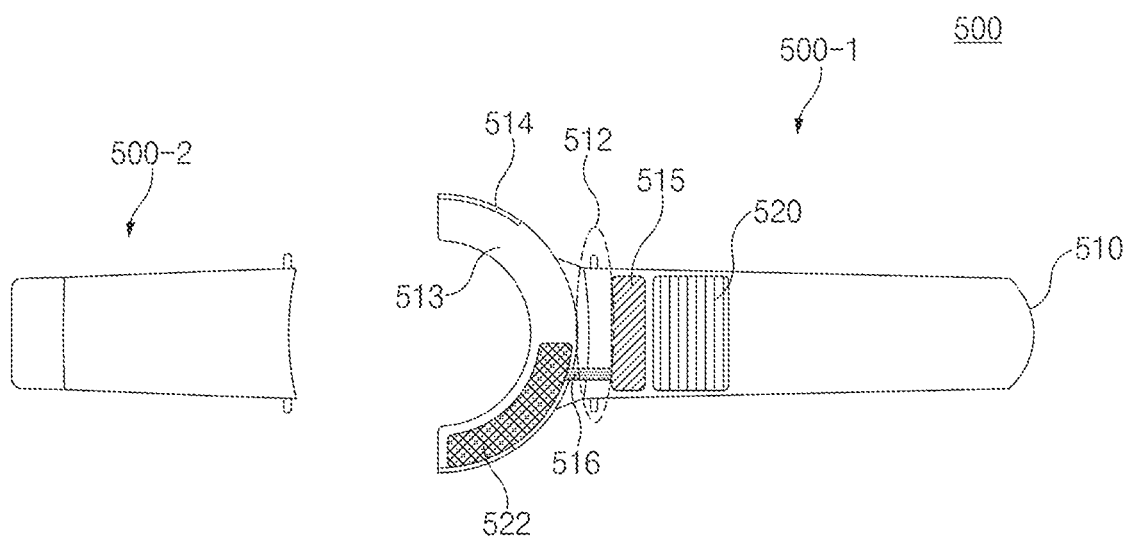
FIG. 5B is a front view of a binding member, according to an embodiment.
Figure 5C:
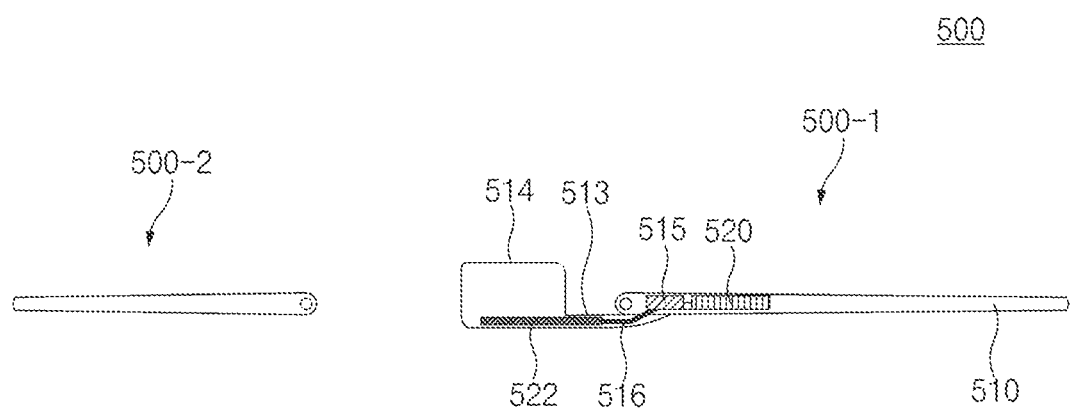
FIG. 5C is aside view of a binding member, according to an embodiment.
Figure 5D:
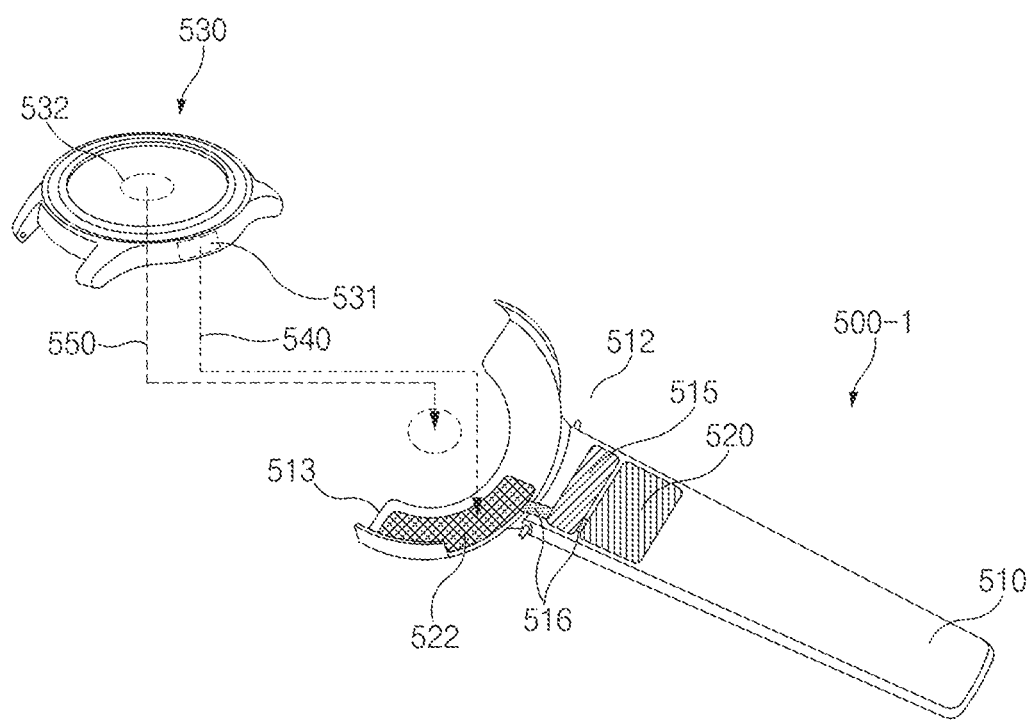
FIG. 5D is a view illustrating a binding state between a main body and a binding member, according to an embodiment.
Figure 5E:
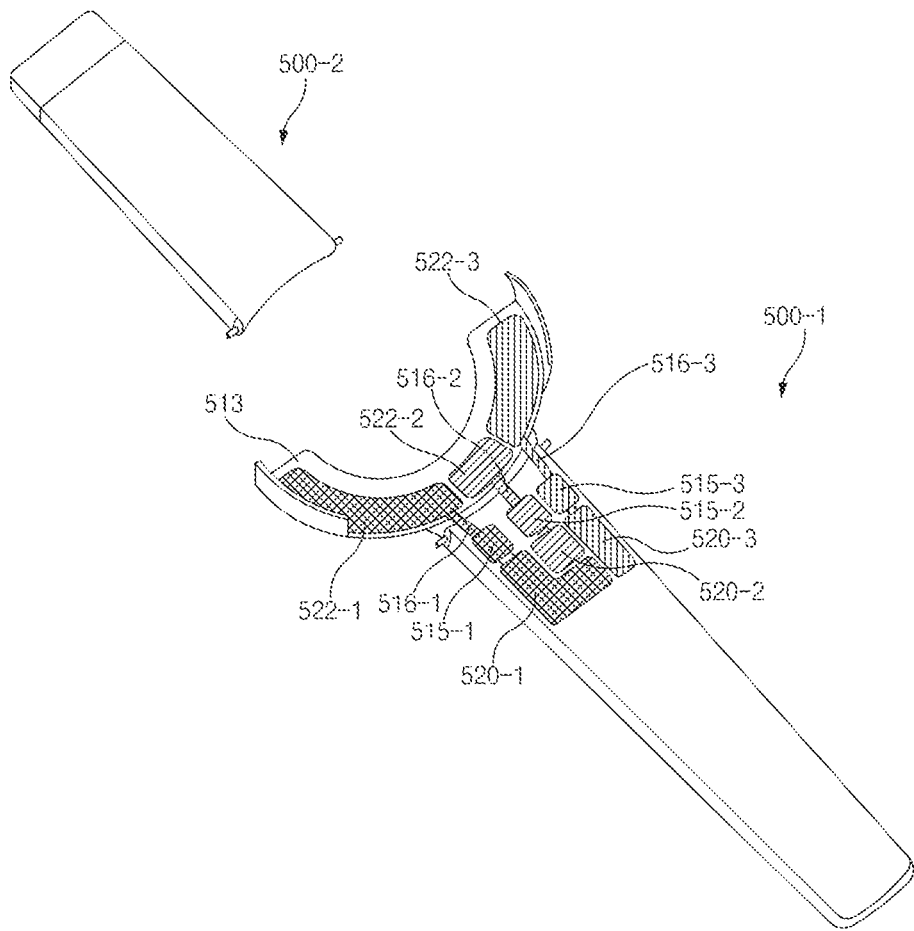
FIG. 5E is a view illustrating a configuration of a binding member, according to an embodiment.

FIG. 5A is a perspective view illustrating a binding member, according to an embodiment. FIG. 5B is a front view of a binding member, FIG. 5C is a side view of the binding member, FIG. 5D is a view illustrating a binding state between a main body and a binding member, according to various embodiments. FIG. 5E is a view illustrating a configuration of a binding member, according to an embodiment.

Referring to FIGS. 5A-5D, a binding member 500 (e.g., the binding member 220 of FIG. 2A) includes a first binding member 500-1 (e.g., the first binding member 220-1 of FIG. 2A) and a second binding member 500-2 (e.g., the second binding member 220-2 of FIG. 2A), and the first binding member 500-1 and the second binding member 500-2 are coupled to one side and an opposite side of a main body 530 (e.g., the main body 210 of FIG. 2A), respectively.

The first binding member 500-1 (and/or the second binding member 500-2) include a body 510 (or a strap body) and a coupling part 512.

At least a portion of the body 510 may include at least one of various materials, such as leather, silicon, rubber, or a metal member. For example, the body 510 has a specific length and a specific width in a direction away from the main body 530, and may at least partially have a flat shape.

The coupling part 512 may be formed at one end portion of the body 510 and coupled to one side of the main body 530. The binding member 500 (e.g., the first binding member 500-1 and/or the second binding member 500-2) may be coupled to the main body 530 through a coupling pin passing through the coupling part 512. However, this is provided for an illustrative purpose, and the structures of the coupling part 512 and the main body 530 are not limited thereto.

A second antenna 520 may be included inside the body 510 and may have a structure disposed inside the body 510 such that the second antenna 520 is not substantially exposed to the outside.

The first binding member 500-1 (and/or the second binding member 500-2) may include an expansion part 513 expanded inward of the main body 530 from one end portion of the body 510. A coupler 522 may be disposed inside the expansion part 513. For example, the coupler 522 may have a structure disposed inside the expansion part 513 such that the coupler 522 is not substantially exposed to the outside. The coupler 522 may electrically connect the second antenna 520 disposed in the first binding member 500-1 with a first antenna 531 disposed in the main body 530.

As illustrated in FIG. 5D, the coupler 522 disposed (included) in the first binding member 500-1 may be disposed to be vertically aligned with (or to be at least partially overlapped with the first antenna 531, when viewed above from the first surface 211a) the first antenna 531 disposed in the main body 530, to enhance the electrical coupling force between the first antenna 531 and the second antenna 520. When the first binding member 500-1 is bound to the main body 530, the coupler 522 may be configured to be disposed opposite to a lower end of the main body 530 corresponding to the first antenna 531. However, this is provided for an illustrative purpose, and the above-described structure of the coupler 522 is not limited thereto. For example, when the first binding member 500-1 is coupled to the main body 530, the coupler 522 may be disposed to face the side surface, which corresponds to the first antenna 531, of the main body 530.

The binding member 500 (e.g., the first binding member 500-1 and/or the second binding member 500-2) may include at least one fixing rib 514 protruding upward from the expansion part 513. An inner part of the at least one fixing rib 514 may make contact with at least a portion of an outer surface of the main body 530 to prevent the expansion part 513 from being moved in a lateral direction, when the binding member 500 (e.g., the first binding member 500-1) is coupled to the main body 530. Accordingly, the coupler 522 may be maintained to be vertically aligned with the first antenna 531 of the main body 530, thereby improving the electrical coupling force between the first antenna 531 and the second antenna 520.

A matching circuit 515 may be interposed between the coupler 522 and the second antenna 520. The coupler 522 and the matching circuit 515 may be connected with each other through an RF cable 516, and the second antenna 520 and the matching circuit 515 may be connected with each other through the RF cable 516. The matching circuit 515 may be disposed in the expansion part 513.

As illustrated in FIG. 5D, the expansion part 513 (or the coupler 522) of the first binding member 500-1 may be configured such that the expansion part 513 does not interfere with another component of the main body 530. The main body 530 may include an electrode 534 (e.g., the second electrode 217) configured to obtain bio-information in contact with the part of the body and/or an optical sensor 532 (e.g., the optical sensor 219) to irradiate light toward the part of the body to obtain the bio-information. At least a portion of the electrode 534 and/or the optical sensor 532 may have a structure exposed through the housing of the main body 530. In this regard, when the first binding member 500-1 is bound to the main body 530, the expansion part 513 (or the coupler 522) of the first binding member 500-1 may be disposed such that the expansion part 513 is not vertically aligned with the electrode 534 and/or the optical sensor 532.

As illustrated in FIG. 5E, the first binding member 500-1 may be implemented in a structure including a plurality of second antennas. For example, the body 510 of the first binding member 500-1 may include a second antenna 520-1 associated with a signal in a first band, a second antenna 520-2 associated with a signal in a second band, and a third antenna 520-3 associated with a signal in a third band. The signal in the first band may include a signal in a GNSS band, the signal in the second band may include a signal in an NFC band, and a signal in a third band may include a signal in a WiFi and Bluetooth band.

A first coupler 522-1 may be disposed in a first area of the expansion part 513 formed in the first binding member 500-1 to electrically connect the second antenna 520-1 associated with the signal in the first band, with the first antenna (e.g., the first antenna 531) associated with the signal in the first band, which is disposed in the main body 530. The first area of the expansion part 513 may be vertically aligned with the first antenna disposed in the main body 530 and associated with the signal in the first band. For example, the second antenna 520-1 associated with the signal in the first band may be connected with the first coupler 522-1 through a first matching circuit 515-1 and a first RF cable 516-1.

A second coupler 522-2 may be disposed in a second area of the expansion part 513 formed in the first binding member 500-1 to electrically connect the second antenna 520-2 associated with the signal in the second band, with the first antenna (e.g., the first antenna 531) associated with the signal in the second band, which is disposed in the main body 530. The second area of the expansion part 513 may be vertically aligned with the first antenna which is disposed in the main body 530 and associated with the signal in the second band. The second antenna 520-2 associated with the signal in the second band may be connected with the second coupler 522-2 through a second matching circuit 515-2 and a second RF cable 516-2.

A third coupler 522-3 may be disposed in a third area of the expansion part 513 formed in the first binding member 500-1 to electrically connect the third antenna 520-3 associated with the signal in the third band, with the first antenna (e.g., the first antenna 531) associated with the signal in the third band, which is disposed in the main body 530. The second area of the expansion part 513 may be vertically aligned with the first antenna which is disposed in the main body 530 and associated with the signal in the third band. The third antenna 520-3 associated with the signal in the third band may be connected with the third coupler 522-3 through a third matching circuit 515-3 and a third RF cable 516-3.

Although the expansion part 513 is formed in the first binding member 500-1, according to the above-described embodiment, the disclosure is not limited thereto. For example, the expansion part 513 may be formed in the second binding member 500-2 or may be formed in both the first binding member 500-1 and the second binding member 500-2.

As described above, according to various embodiments, the first antenna 531 and the second antenna 520 may be electrically coupled to each other by a magnetic field generated from the coupler 522. In this regard, as described below with reference to FIG. 6, when the binding member 500 (e.g., including the first binding member 500-1 and/or the second binding member 500-2) is bound to the main body 530, the movement of the coupler 522 is restricted, thereby enhancing the electrical coupling force between the first antenna 531 and the second antenna 520.

Figure 6A:
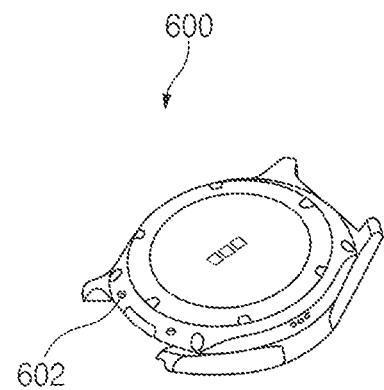
FIGS. 6A and 6B are views illustrating configurations of a main body and a binding member, according to various embodiments.
Figure 6B:
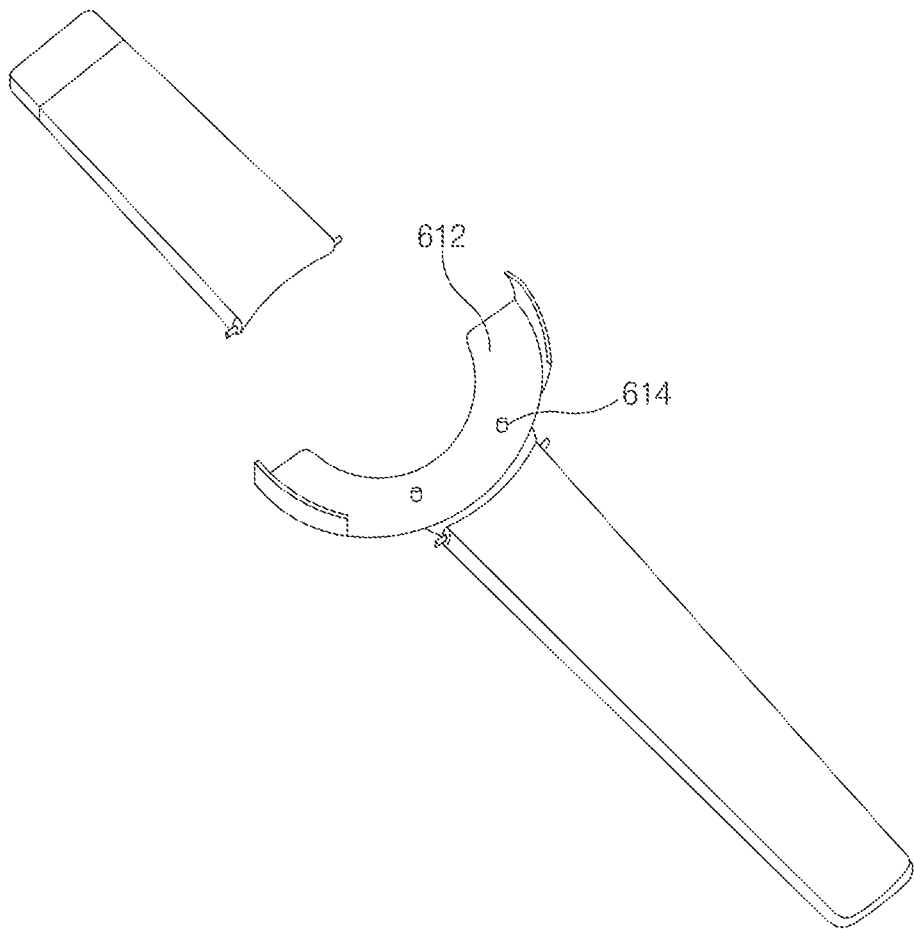

FIGS. 6A and 6B are views illustrating configurations of a main body and a binding member, according to various embodiments.

Referring to FIGS. 6A and 6B, to improve the electrical connection (e.g., magnetic coupling or coupling connection) between an antenna (e.g., the first antenna 531) of a main body 600 and an antenna (e.g., the second antenna 520) of a binding member 610, at least one fixing protrusion 614 is formed on the binding member 610, and at least one fixing groove 602 is formed in a lower end of the main body 600 to correspond to the at least one fixing protrusion 614

The at least one fixing protrusion 614 may be formed to protrude from a bottom of an expansion part 612 of the binding member 610, which makes contact with a lower end of the main body 600, when the binding member 610 is coupled to the main body 600. For example, as illustrated in FIG. 6B, fixing protrusions 614 are formed at left and right sides of the center of the expansion part 612. However, this is provided for illustrative purposes, and the number of fixing protrusions 614, the position of the fixing protrusions 614, and the shape of the fixing protrusions 614 are not limited thereto.

When the binding member 610 is bound to the main body 600, the at least one fixing protrusion 614 formed on the binding member 610 may be received in the at least one fixing groove 602 formed in the lower end of the main body 600. In this case, in the state that the at least one fixing protrusion 614 is received in the at least one fixing groove 602, the coupler is restricted from being moved in the lateral direction and thus maintained to be vertically aligned with the antenna of the main body 600.

Although the fixing protrusion 614 is formed on the binding member 610, and the fixing groove 602 is formed in the main body 600, the disclosure is not limited thereto. For example, the fixing protrusion 614 may be formed on the main body 600, and the fixing groove 602 may be formed in the binding member 610. In addition, the first fixing protrusion and the first fixing groove may be formed in the main body 600, and a second fixing groove corresponding to the first fixing protrusion and a second fixing protrusion corresponding to the first fixing groove may be formed in the binding member 610.

Figure 7A:
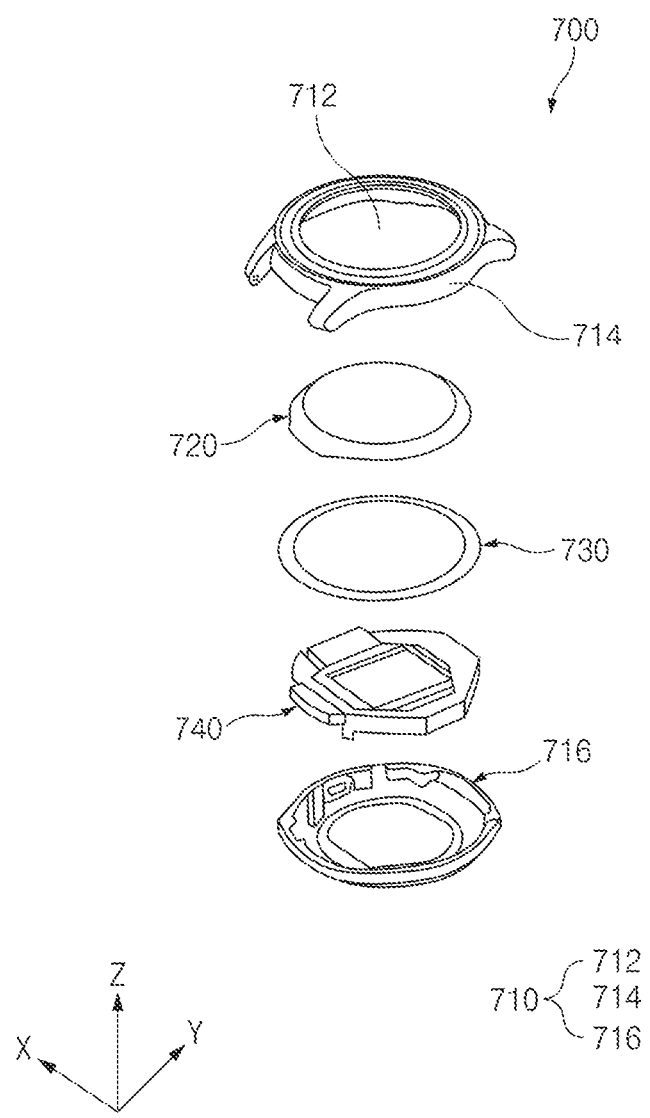
FIGS. 7A and 7B are views illustrating a configuration of a binding member, according to various embodiments.
Figure 7B:
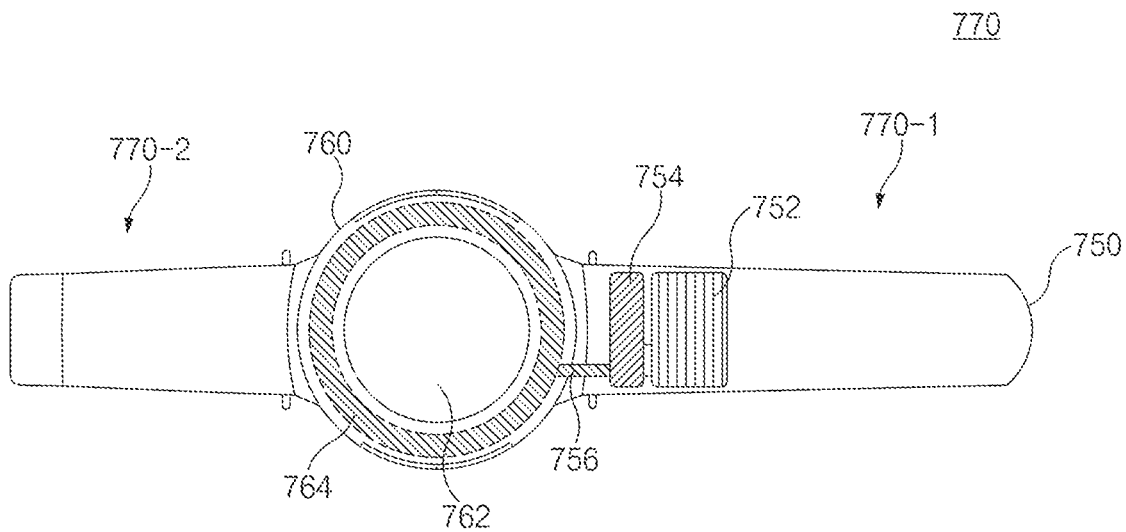

FIGS. 7A and 7B are views illustrating the configuration of a binding member, according to various embodiments.

Referring to FIG. 7A, a main body 700 includes a housing 710, a display 720, a first antenna 730, and a support member 740. However, the disclosure is not limited thereto. For example, the main body 700 may further include various components, such as a PCB, or a battery, in addition to the above components. The housing 710 may include a front member 712, a side member 714, and a rear member 716.

The support member 740 may be interposed between the rear member 716 and the front member 712, and the display 720 may be supported by the support member 740, such that stiffness is ensured. The first antenna 730 may be provided in the form of a flat coil, and may be disposed on the support member 740.

As illustrated in FIG. 7B, a binding member 770 may include a first binding member 770-1 and a second binding member 770-2, and may include a coupler 764.

The first binding member 770-1 and/or the second binding member 770-2 may include a body 750 and an expansion part 760. For example, the first binding member 770-1 may include the circular expansion part 760 which has a shape corresponding to a shape of the first antenna 730 and/or the rear member 716 of the housing 710 and faces the rear member 716 of the housing 710.

A coupler 764 may be disposed in the shape, which corresponds to the shape of the first antenna 730, in the expansion part 760. For example, the coupler 764 may be connected with a second antenna 752, which is disposed in the body 750, through a matching circuit 754 and an RF cable 756.

The expansion part 760 may include at least one opening 762. Accordingly, when the binding member 770 is bound to the main body 700, at least a portion (e.g., the electrode 534 or the optical sensor 532) of a lower portion of the main body 700 may be exposed through the at least one opening 762.

In the binding member 770 described with reference to FIGS. 7A and 7B, the expansion part 760 may have the structure corresponding to the shape of the rear member 716 of the housing 710, which is different from the binding member 500 described above with reference to FIG. 5A to FIG. 5E. Regarding the binding member 500 described above with reference to FIG. 5A to FIG. 5E, when the electronic device is applied to the body of a user, a part of the body makes contact with the main body 530, and another part of the body of the user makes contact with the expansion part 513, thereby causing the user to feel and/or sense the difference. To the contrary, regarding the binding member 770 described with reference to FIGS. 7A and 7B, when the electronic device is worn on the body of the user, the body of the user substantially makes contact with only the expansion part 760. Accordingly, the sense of difference felt by the user may be reduced.

Figure 8A:
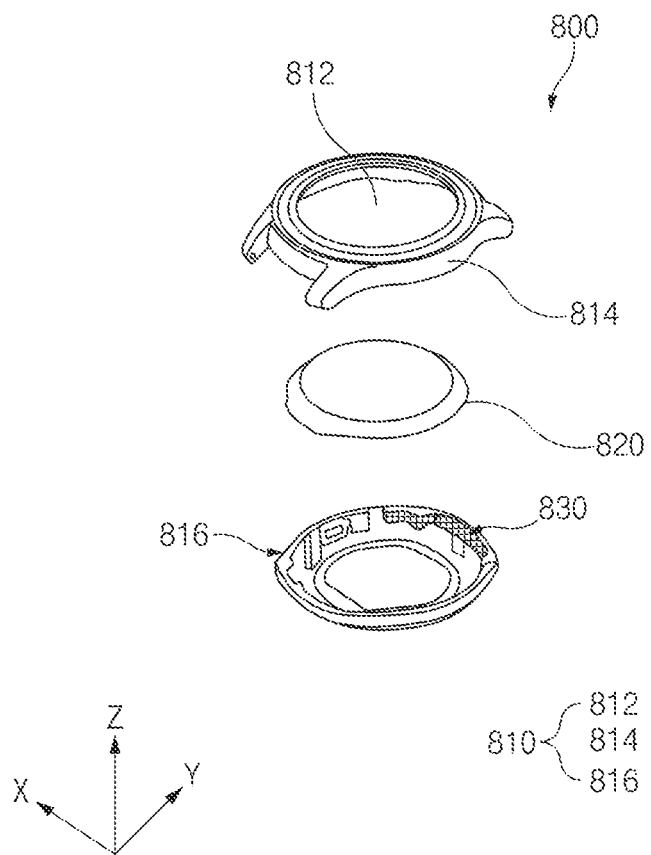
FIGS. 8A and 8B are views illustrating a configuration of a binding member, according to various embodiments.
Figure 8B:
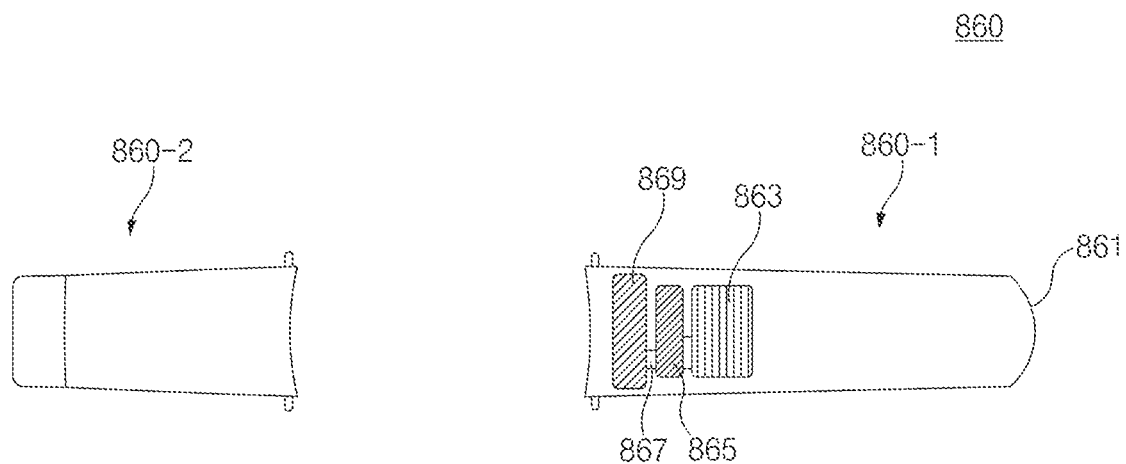

FIGS. 8A and 8B are views illustrating a configuration of a binding member, according to various embodiments.

Referring to FIG. 8A, a main body 800 includes a housing 810, a display 820, and a first antenna 830. The housing 810 may include a front member 812, a side member 814, and a rear member 816. However, this is provided for an illustrative purpose, and the disclosure is not limited thereto. For example, the main body 800 may further include various components, such as a PCB, a support member, or a battery, in addition to the above components.

The first antenna 830 may be provided in the form of a coil and disposed in the rear member 816 of the housing 810. When a binding member 860 is bound to the main body 800, the first antenna 830 may be disposed to face the binding member 860.

As illustrated in FIG. 8B, the binding member 860 may include a first binding member 860-1 and a second binding member 860-2, and may include a coupler 869 disposed to be close to the first antenna 830.

The first binding member 860-1 (and/or the second binding member 860-2) may be connected with one side of the main body 800, and may include a body 861 having a specific length and a specific width in a direction away from the main body 800. For example, the coupler 869 may be disposed at one end of the body 861 coupled to one side of the main body 800 to be horizontally aligned with the first antenna 830. In addition, the coupler 869, a matching circuit 865, an RF cable 867, and a second antenna 863 may be disposed in the body 861.

Figure 9A:
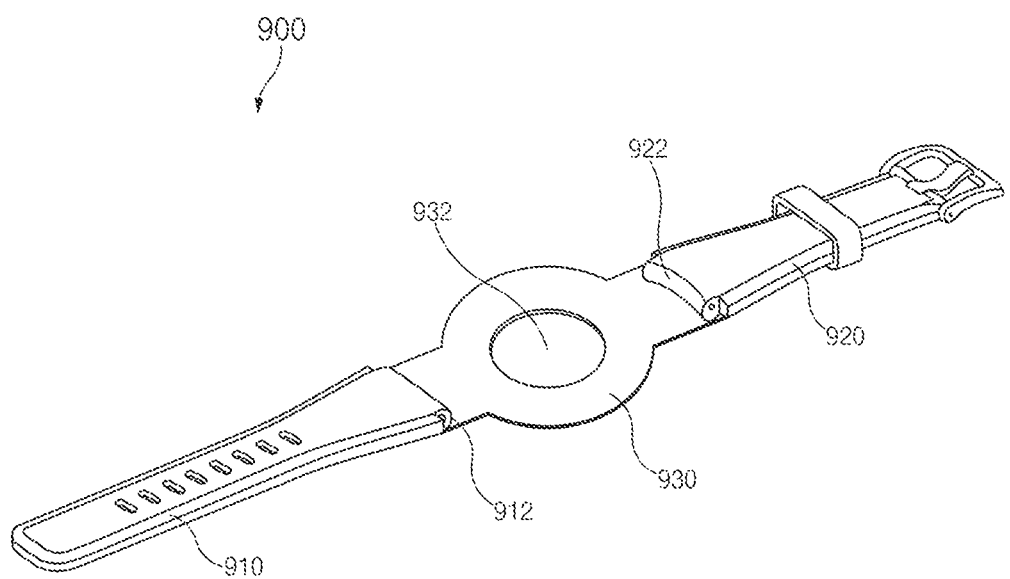
FIGS. 9A and 9B are views illustrating a binding member, according to various embodiments.
Figure 9B:
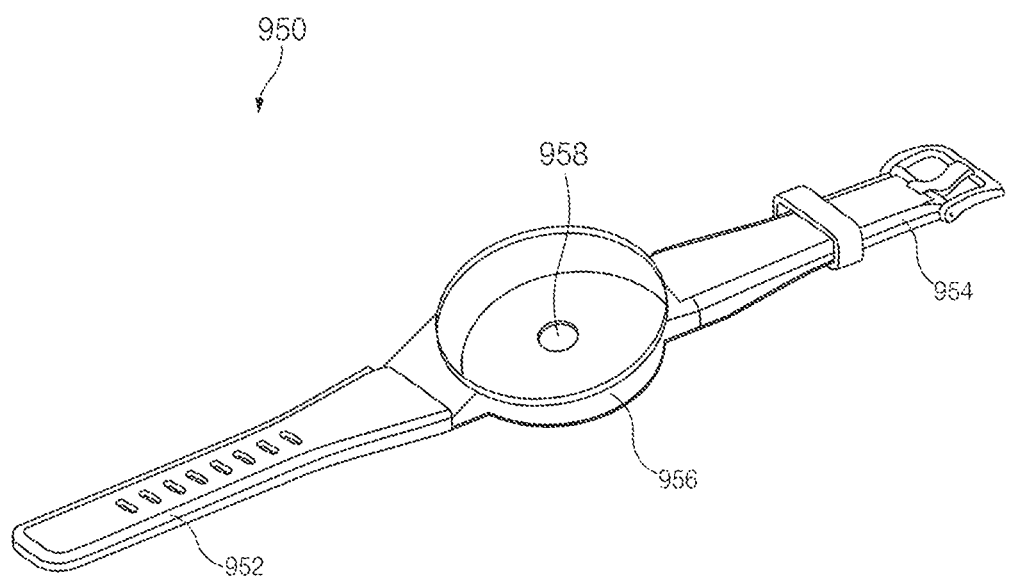

FIGS. 9A and 9B are views illustrating a binding member, according to various embodiments.

Referring to FIG. 9A, a binding member 900 has a structure bound to a main body in a pin binding manner. The binding member 900 includes a first binding member 910 (or a first strap body), a second binding member 920 (or a second strap body), and a coupling member 930 to couple the first binding member 910 to the second binding member 920.

The coupling member 930 may be positioned on a bottom surface of a main body, when the binding member 900 is bound to the main body. The coupling member 930 may be coupled to one end portion of the first binding member 910 and one end portion of the second binding member 920, and may be provided in the shape of a circle corresponding to the shape of the bottom surface of the main body. A coupler (e.g., the coupler 522) may be disposed in at least a portion of the coupling member 930.

The binding member 900 may include at least one opening 932. When the binding member 900 is bound to the main body (e.g., the main body 530), at least a portion (e.g., the electrode 534 or the optical sensor 532) of the bottom surface of the main body 530 may be exposed through the at least one opening 932.

The binding member 900 may include a first coupling part 912 formed at one end portion of the first binding member 910 and a second coupling part 922 formed at one end portion of the second binding member 920. According to an embodiment, the first coupling part 912 is configured to be coupled to one side of the main body through a first coupling pin passing through the first coupling part 912, and the second coupling part 922 is configured to be coupled to an opposite side of the main body through a second coupling pin passing through the second coupling part 922

As illustrated in FIG. 9B, a binding member 950 is bound to the main body in a fitting manner.

The binding member 950 may include a first binding member 952, a second binding member 954, and a seating part 956. According to an embodiment, the seating part 956 has an upper portion, which is open, a lower portion having an opening 958, which is at least partially closed, and a side portion which is elastically deformed along the circumference of the opening. For example, a coupler (e.g., the coupler 522) may be disposed in at least a portion of the seating part 956.

When the main body is fitted into the seating part 956 in a fitting manner, the coupler disposed in the seating part 956 may be vertically aligned with an antenna (e.g., the first antenna 531) of the main body. The opening 958 may be formed in a lower end portion of the seating part 956 to expose at least a portion (e.g., the electrode 534 or the optical sensor 532) of the bottom surface of the main body.

FIGS. 10A and 10B are views illustrating a binding member and an electronic device, according to various embodiments.

Referring to FIG. 10A, a binding member 1020 includes a protective case to protect an electronic device 1010 from an impact, as the binding member 1020 is coupled to the electronic device 1010.

The electronic device 1010 may include a first antenna 1012 configured to transmit and/or receive a signal in a first frequency band and a second antenna 1014 configured to transmit and/or receive a signal in a second frequency band.

The binding member 1020 may include an external antenna 1021 configured to transmit and/or receive the signal in the first frequency band and the signal in the second frequency band, a first coupler 1023 to electrically connect the external antenna 1021 with the first antenna 1012, and a second coupler 1027 to electrically connect the external antenna 1021 with the second antenna 1014. In addition, the binding member 1020 may include a matching circuit 1025 to perform impedance matching for the signal in the first frequency band and the signal in the second frequency band, which are received through the external antenna 1021, between the first coupler 1023 and the second coupler 1027, and an RF cable 1029 to connect the external antenna 1021, the first coupler 1023 and the second coupler 1027.

The first coupler 1023 of the binding member 1020 may be disposed to be vertically or horizontally aligned with the first antenna 1012, when the binding member 1020 is bound to the electronic device 1010. In addition, the second coupler 1027 of the binding member 1020 may be disposed to be vertically or horizontally aligned with the second antenna 1014, when the binding member 1020 is bound to the electronic device 1010.

For example, the signal in the first frequency band, which is received through the external antenna 1021, may be sent to the first antenna 1012 through the first coupler 1023, and the signal in the second frequency band, which is received through the external antenna 1021, may be sent to the second antenna 1014 through the second coupler 1027. Accordingly, the electronic device 1010 may process a signal, which is received through the external antenna 1021 having an improved performance, in the state in which the electronic device 1010 is bound to the binding member 1020.

As illustrated in reference sign (a) of FIG. 10B, a binding member 1030 is included in a transportation apparatus such as a vehicle or a bicycle. The binding member 1030 may provide expanded service through the electronic device 1040 or the transportation apparatus, as the binding member 1030 is bound to the electronic device 1040. For example, the binding member 1030 may be configured as a portion of a dashboard of a vehicle, and may include an external antenna.

The binding member 1030 may have a receiving groove 1032 to receive the main body of the electronic device 1040. A coupler 1034 may be disposed in the receiving groove 1032 to electrically connect the external antenna with an embedded antenna in the main body. Accordingly, as illustrated in reference sign (b) of FIG. 10B, when the electronic device 1040 is fitted into the receiving groove 1032 of the main body, the coupler 1034 disposed in the receiving groove 1032 is disposed to be vertically or horizontally aligned with (e.g., electrically connected to) the embedded antenna of the main body. In other words, the coupler 1034 may be electrically connected with the embedded antenna of the main body by being disposed in the receiving groove 1032 in the above-described manner.

According to an embodiment, an electronic device (e.g., the electronic device 300) may include a housing (e.g., the main body 310) including a first antenna (e.g., the first antenna 316) and a binding member (e.g., the binding member 320) bound to one side of the housing. The binding member may include a strap body (e.g., the body 510), a coupling part (e.g., the coupling part 512) formed at one end portion of the strap body and coupled with one side of the housing, an expansion part (e.g., the expansion part 513) expanded inward from the housing from the one end portion of the strap body and configured to make contact with at least a portion of a rear surface of the housing, a second antenna (e.g., the second antenna 326) provided in the strap body, and a coupler (e.g., the coupler 322) electrically connected with the second antenna, provided in at least a portion of the expansion part, and configured to transmit a signal received through the second antenna to the first antenna.

The coupler may be disposed to be vertically aligned with the first antenna.

A sensor (e.g., the optical sensor 532) may have a portion that is exposed through the rear surface of the housing, and the expansion part may be formed without being overlapped with the sensor.

A sensor may have a portion that is exposed through the rear surface of the housing, and the coupler may be formed without being overlapped with the sensor.

An RF cable (e.g., the RF cable 516) may be included to connect the coupler with the second antenna.

An impedance matching circuit (e.g., the matching circuit 515) may be interposed between the second antenna and the coupler.

The second antenna may be configured to receive a signal in at least a partial band overlapped with a frequency band received by the first antenna.

The coupler may include a resonance coupler including a first inductance component to generate magnetic coupling together with a second inductance component constituting the first antenna.

The expansion part may include at least one fixing protrusion (e.g., the fixing protrusion 614) or at least one fixing groove (e.g., the fixing groove 602), and the rear surface of the housing may further include the at least one fixing protrusion or the at least one fixing groove not included in the expansion part.

When the binding member is coupled to the housing, the at least one fixing protrusion may be configured to be received in the at least one fixing groove.

According to an embodiment, a binding member (e.g., the binding member 320) bound to an electronic device (e.g., the electronic device 300) may include a strap body (e.g., the body 510), an antenna (e.g., the second antenna 326) provided in the strap body, and a coupler (e.g., the coupler 322) electrically connected with the antenna and configured to be sent a signal received through the antenna to the electronic device.

The strap may include an expansion part (e.g., the expansion part 513) expanded inward from the electronic device from the one end portion of the strap body and configured to make contact with at least a portion of a rear surface of the electronic device, and the coupler may be disposed in at least a portion of the expansion part.

The strap may further include a coupling part (e.g., the coupling part 512) formed at one end portion of the strap body and coupled to one side of the electronic device, and the coupler may be disposed in at least a portion of the coupling part.

A first strap body (e.g., the first binding member 910) may be bound to one end portion of the electronic device, a second strap body (e.g., the second binding member 920) may be bound to an opposite end portion of the electronic device, and a coupling member (e.g., the coupling member 930) may couple one end portion of the first strap body and one end portion of the second strap body, and may make contact with a bottom surface of the electronic device, when the binding member is bound to the electronic device.

The coupling member may include at least one opening, and at least a portion of the bottom surface of the electronic device may be exposed through the at least one opening, when the binding member is bound to the electronic device.

A coupling part (e.g., the first coupling part 912 and/or the second coupling part 922) may be formed at one end portion of the strap body and coupled to one side of the electronic device. The binding member may be bound to the electronic device through a fixing pin passing through the coupling part.

A first strap body (e.g., the first binding member 952), a second strap body (e.g., the second binding member 954), and a seating part (e.g., the seating part 956) may be coupled to one end portion of the first strap body and one end portion of the second strap body. The first stop body, second strap body, and seating part may have an upper portion, which is open, a lower portion, which is at least partially closed and has an opening, and a side portion which is elastically deformed along the circumference of the opening.

The coupler may be disposed in at least a portion of the seating part.

The seating part may include at least one opening, and at least a portion of the bottom surface of the electronic device may be exposed through the at least one opening, when the binding member is bound to the electronic device.

An impedance matching circuit (e.g., the matching circuit 515) may be interposed between the second antenna and the coupler.

Figure 11:
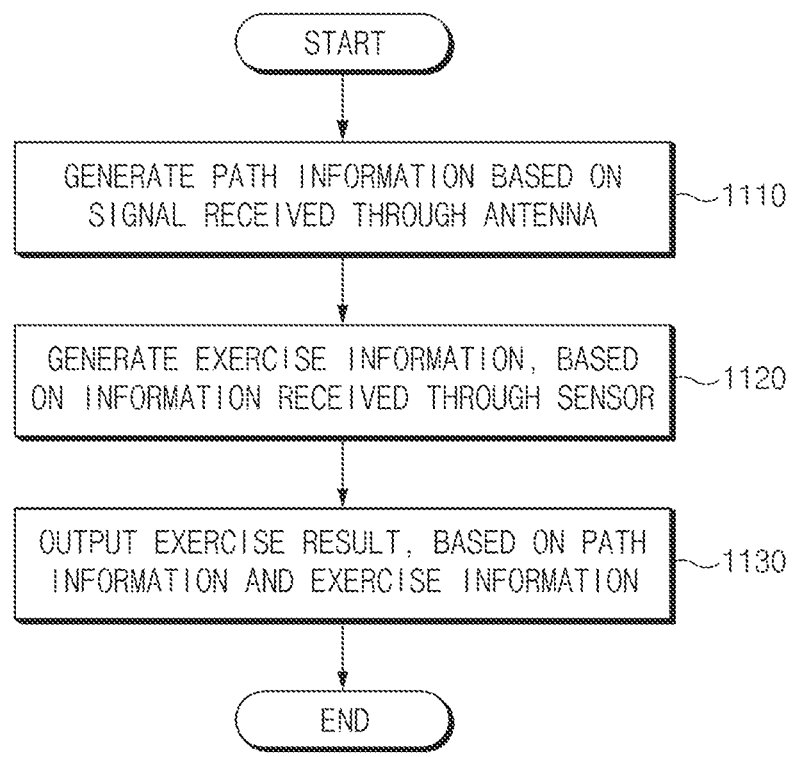
FIG. 11 is a flowchart illustrating the operating method of an electronic device, according to an embodiment.

FIG. 11 is a flowchart illustrating the operating method of an electronic device, according to an embodiment. FIGS. 12A to 12D are views illustrating antenna performance of an electronic device, according to various embodiments. FIG. 12E is a view illustrating an exercise result generated based on a signal received through an antenna of an electronic device, according to an embodiment. Operations may be sequentially performed according to an embodiment, but the disclosure is not limited thereto. For example, the sequence of the operations may be changed, and at least two operations may be performed in parallel. In addition, at least one of the above operations may be omitted.

Referring to FIG. 11, the electronic device 300 generates path information based on a signal received through an antenna in step 1110. For example, the electronic device 300 may receive a signal through an embedded antenna and may use the signal to generate the path information. In addition, the electronic device 300 may receive a signal through an external antenna and may use the signal to generate the path information. Additionally, the electronic device 300 may receive a signal through an external antenna and an embedded antenna, and may use the signal to generate the path information.

The embedded antenna may include a first antenna 316 disposed in the main body 310 described above. In addition, the external antenna may include the second antenna 326 disposed in the binding member 320.

The space of the main body, in which the embedded antenna is mounted, may be narrower than the inner space of the binding member, in which the external antenna is mounted. The external antenna may support more various frequency bands, as compared to the embedded antenna, and may sufficiently ensure the antenna length.

Accordingly, when the performance of the embedded antenna and the external antenna are compared with each, the external antenna may exhibit a better performance than the embedded antenna.

Figure 12A:
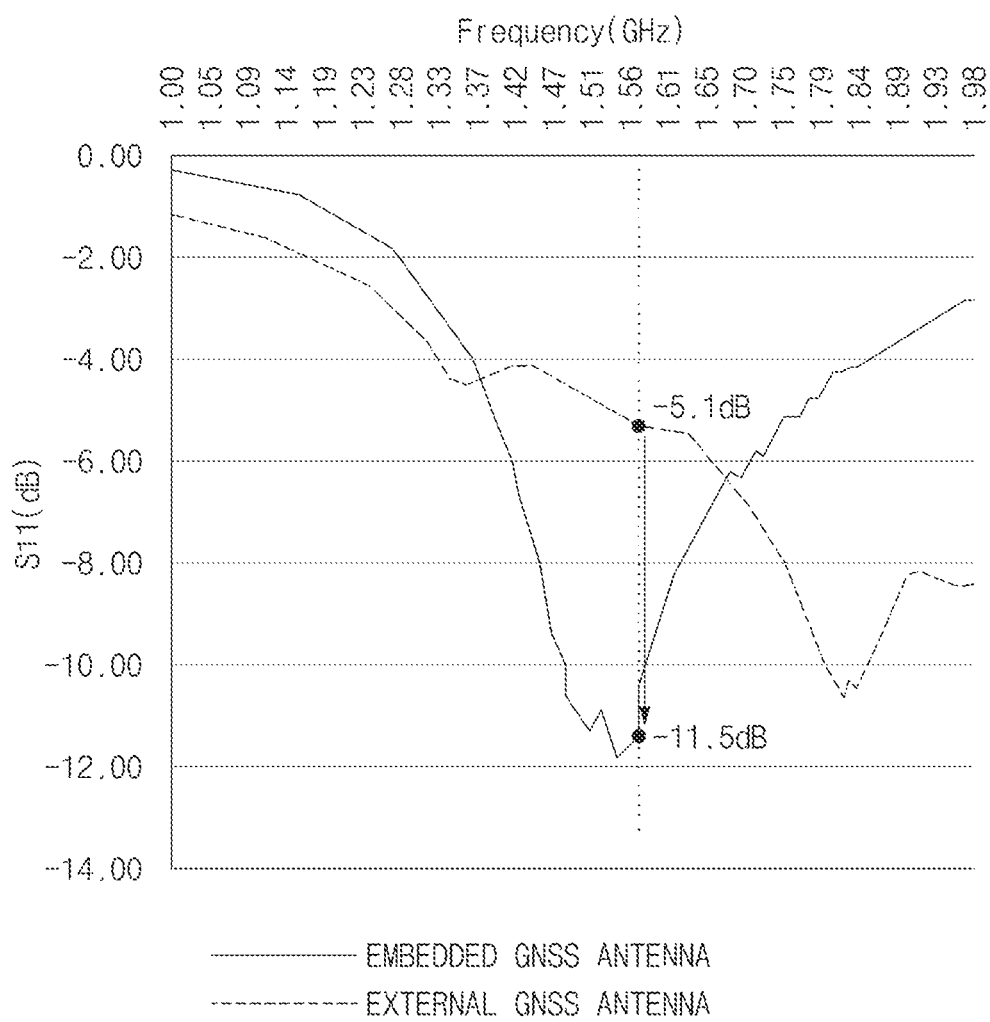
FIGS. 12A to 12D are views illustrating antenna performance of an electronic device, according to various embodiments.
Figure 12B:
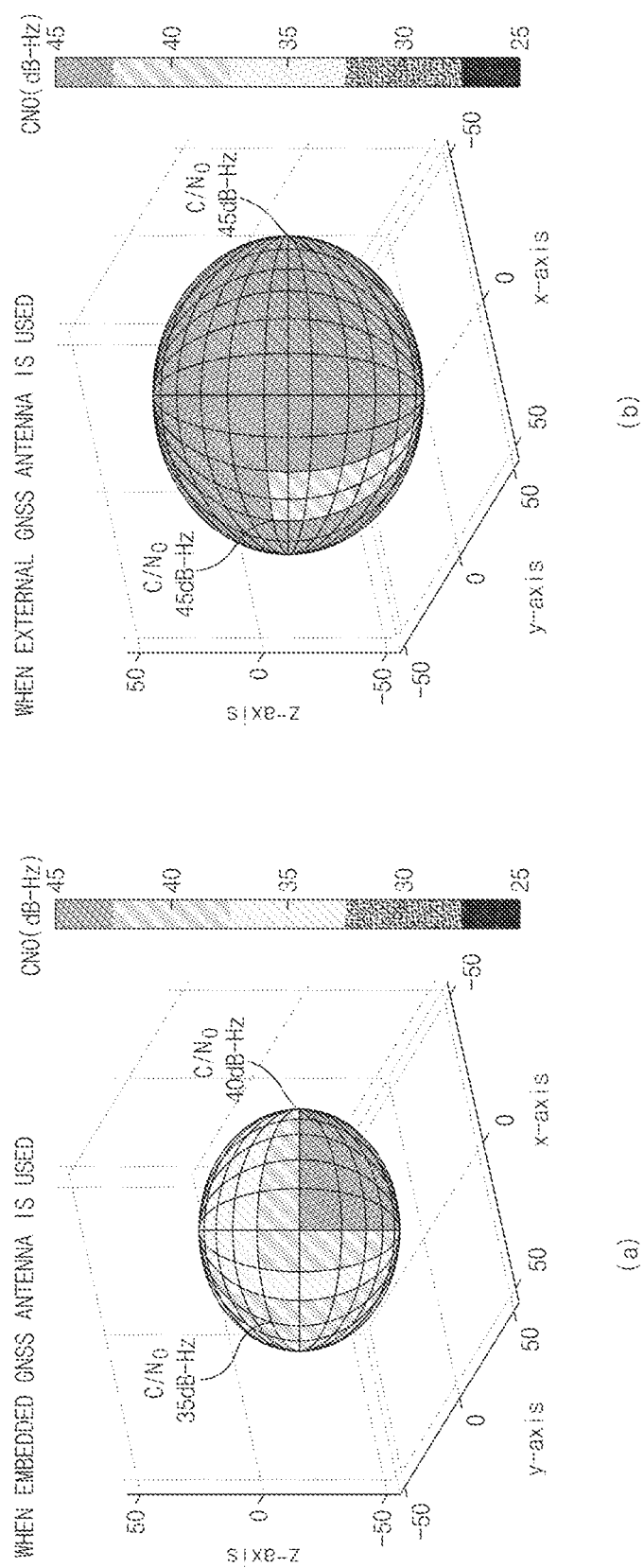
Figure 12C:
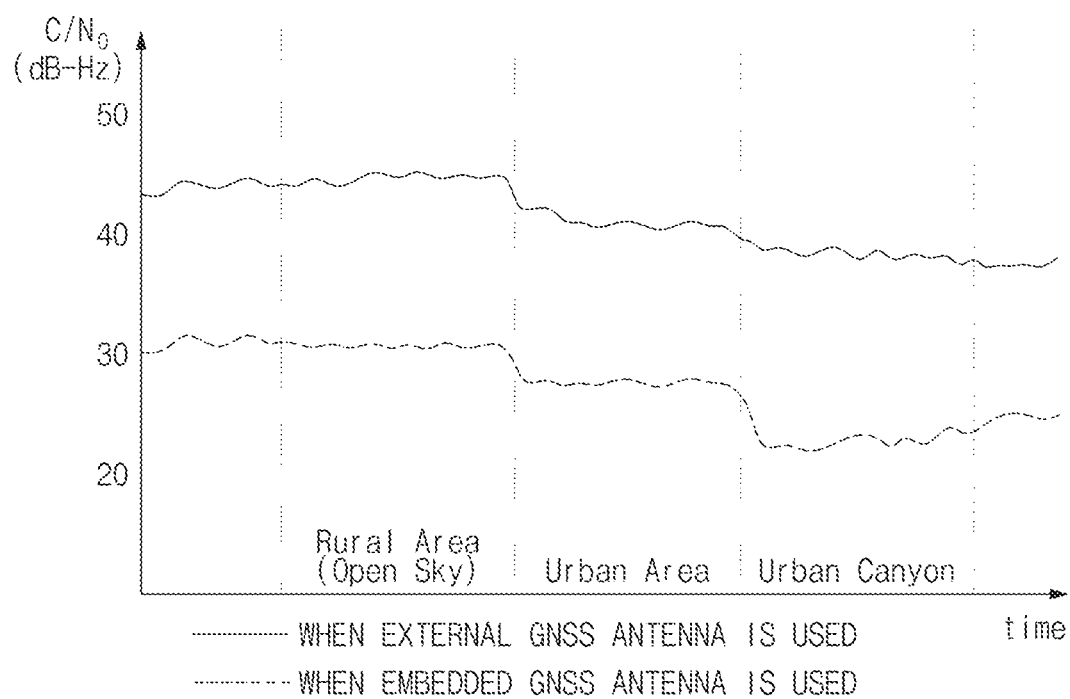

For example, it may be recognized from FIG. 12A that the external antenna (e.g., the external GNSS antenna) is superior to the embedded antenna (e.g., the embedded GNSS antenna) in radiation characteristics. In addition, it may be recognized from reference sign (a) of FIG. 12B that the sensitivity (35 decibel-Hertz (dB-Hz)) of a signal received in a direction different from a specific direction is lower than the sensitivity (40 dB-Hz) of a signal received in a specific direction (e.g., a direction of a front surface of the electronic device) in the embedded antenna (e.g., the embedded GNSS antenna). To the contrary, it may be recognized from reference sign (b) of FIG. 12B that the sensitivity (45 dB-Hz) of a signal received in all directions is higher in the external antenna (e.g., the antenna GNSS antenna). In addition, it may be recognized from FIG. 12C that the strength of a received signal is higher in a rural area without an obstacle, such as a big building, and the strength of a signal is attenuated to degrade signal quality in an urban canyon having many obstacles, in the embedded antenna (e.g., the embedded GNSS antenna). On the other hand, it may be recognized that the strength of the received signal is higher in the urban canyon and the rural area, in the external antenna (e.g., the external GNSS antenna).

Figure 12D:
Figure 12E:
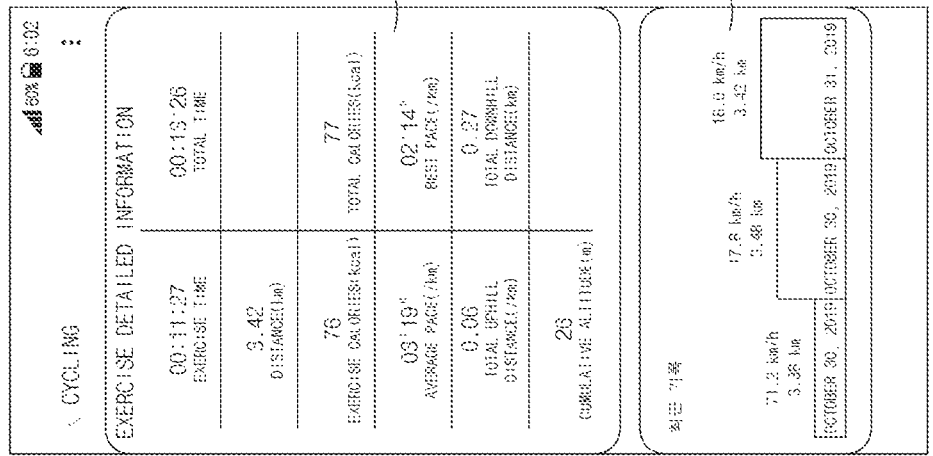
FIG. 12E is a view illustrating an exercise result generated based on a signal received through an antenna of an electronic device, according to an embodiment.
Figure 12E:
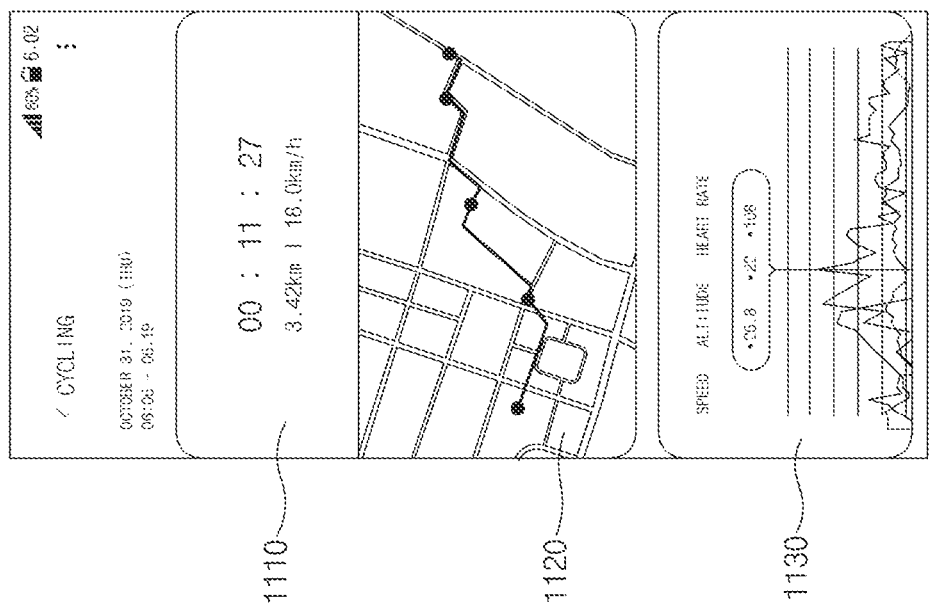

Accordingly, as illustrated in FIG. 12D, the path information generated based on the signal received through the external antenna of the electronic device 300 is substantially similar to a moving path of the electronic device, rather than the path information generated based on the signal received through the embedded antenna.

When the binding member having the external antenna is bound to the main body of the electronic device 300, the embedded antenna may be electrically coupled to the external antenna. Accordingly, as described above with reference to FIGS. 3A-3B, in a state in which the external antenna is not electrically coupled to the embedded antenna, the electronic device 300 may isolate a signal in a specified frequency band (e.g., the signal in the GPS L1 band) from a signal received through the embedded antenna and may generate path information. In addition, in the state that the external antenna is electrically coupled to the embedded antenna, the electronic device may generate the path information by using a signal (e.g., in a GPS L1 band) received through the external antenna. Additionally or alternatively, in the state that the external antenna is electrically coupled to the embedded antenna, the electronic device 300 may isolate a signal (e.g., a WiFi signal or an LTE signal) in another specified band, which is available for another use purpose, from a signal received through the embedded antenna.

Referring again to FIG. 11, the electronic device 300 generates exercise information, based on information received through at least one sensor (e.g., the first electrode 215, the second electrode 217, and the optical sensor 219), in step 1120. The exercise information may be a measurement result for an amount of activity of a user, which lasts for a specific time. The electronic device 300 may sense an exercise having a specific pattern, based on the sensor information collected from at least one specified sensor. The exercise may include a walking exercise, a running exercise, a cycle operation exercise, or an exercise using an exercise device, such as an elliptical or a rowing machine.

In step 1130, the electronic device 300 outputs the exercise result, based on the path information and the exercise information. The electronic device may output the exercise result including an exercise time 1110, an exercise path 1120, and a bio-information 1130, as illustrated in reference sign (a) of FIG. 12E. To this regard, the electronic device 300 may output the detailed information of the exercise result. For example, the electronic device 300 may output exercise detailed information 1140, which includes time spent exercising, an accumulated exercise time, an exercise distance, an average pace, an uphill distance, a downhill distance, a cumulative altitude, calories burned by exercising, or cumulative calories burned, and the latest exercise record 1150 having the comparison between a previous exercise record and a current exercise record.

In addition, in a state in which the binding member is bound to the main body of the electronic device 300, the electronic device 300 may sense a specified event and use the signal received from the external antenna to generate path information. The specified event may be an event for processing the signal of the external antenna to exhibit a better performance. For example, the specified event may be associated with the execution of an application requiring precise positioning (e.g., a map or an exercise application). In this regard, the electronic device 300 may process the signal received from the external antenna, by deactivating the external antenna, before the specified event is sensed, or activating the external antenna when the specified event is sensed.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed is:

1. An electronic device comprising:
   a housing including a first antenna; and
   a binding member bound to one side of the housing,
   wherein the binding member includes:
   a strap body;
   a coupling part formed at one end portion of the strap body and bound to the one side of the housing;
   an expansion part expanded inward towards the housing from the one end portion of the strap body, and configured to make contact with at least a portion of a rear surface of the housing;
   a second antenna provided in the strap body; and
   a coupler electrically connected with the second antenna, provided in at least a portion of the expansion part, and configured to transmit a signal received through the second antenna to the first antenna.

2. The electronic device of claim 1, wherein the coupler is disposed to be vertically aligned with the first antenna.

3. The electronic device of claim 1, further comprising:
   a sensor having a portion that is exposed through the rear surface of the housing,
   wherein the expansion part is formed without being overlapped with the sensor.

4. The electronic device of claim 1, further comprising:
   a sensor having a portion that is exposed through the rear surface of the housing,
   wherein the coupler is formed without being overlapped with the sensor.

5. The electronic device of claim 1, further comprising:
   a radio frequency (RF) cable which connects the coupler with the second antenna.

6. The electronic device of claim 1, further comprising:
   an impedance matching circuit interposed between the second antenna and the coupler.

7. The electronic device of claim 1, wherein the second antenna is configured to:
   receive a signal in at least a partial band overlapped with a frequency band received by the first antenna.

8. The electronic device of claim 1, wherein the coupler includes:
   a resonance coupler including a first inductance component to generate magnetic coupling together with a second inductance component constituting the first antenna.

9. The electronic device of claim 1, wherein the expansion part includes:
   at least one fixing protrusion or at least one fixing groove, and wherein the rear surface of the housing further includes the at least one fixing protrusion or the at least one fixing groove not included in the expansion part.

10. The electronic device of claim 9, wherein the at least one fixing protrusion is configured to be received in the at least one fixing groove, when the binding member is coupled to the housing.

11. A binding member bound to an electronic device, the binding member comprising:
- a strap body;
- an expansion part, when the binding member is bound to the electronic device, expanded inward towards the electronic device from one end portion of the strap body and configured to make contact with at least a portion of a rear surface of the housing of the electronic device;
- a first antenna provided in the strap body; and
- a coupler electrically connected with the first antenna and configured to send a signal, which is received through the first antenna, to the electronic device,
- wherein the coupler is disposed to be vertically aligned with a second antenna provided in the electronic device.

12. The binding member of claim 11, further comprising:
- a coupling part formed at one end portion of the strap body and coupled to one side of the electronic device,
- wherein the coupler is disposed in at least a portion of the coupling part.

13. The binding member of claim 11, further comprising:
- a coupling part formed at one end portion of the strap body and coupled to one side of the electronic device,
- wherein the binding member is bound to the electronic device through a fixing pin passing through the coupling part.

14. The binding member of claim 11, further comprising:
- an impedance matching circuit interposed between the first antenna and the coupler.

15. The binding member of claim 11, wherein the strap body comprises:
- a first strap body bound to one end portion of the electronic device,
- a second strap body bound to an opposite end portion of the electronic device, and
- a coupling member coupled to one end portion of the first strap body and to one end portion of the second strap body, wherein the coupling member makes contact with a bottom surface of the electronic device.

16. The binding member of claim 15, wherein the coupling member comprises at least one opening, and at least a portion of the bottom surface of the electronic device is exposed through the at least one opening.

17. The binding member of claim 11, wherein the strap body comprises:
- a first strap body,
- a second strap body, and
- a seating part coupled to one end portion of the first strap body and one end portion of the second strap body,
- wherein the first strap body, the second strap body, and the seating part form an upper portion which is open, a lower portion which is at least partially closed and has an opening, and a side portion which is elastically deformed along a circumference of the opening.

18. The binding member of claim 17, wherein the coupler is disposed in at least a portion of the seating part.

19. The binding member of claim 17, wherein the seating part includes at least one opening, and at least a portion of a bottom surface of the electronic device is exposed through the at least one opening.

* * * * *